(12) United States Patent
Kobayashi et al.

(10) Patent No.: US 8,289,477 B2
(45) Date of Patent: Oct. 16, 2012

(54) BACKLIGHT APPARATUS AND LIQUID CRYSTAL DISPLAY APPARATUS

(75) Inventors: Takahiro Kobayashi, Okayama (JP);
Motonobu Yoshikawa, Osaka (JP);
Yuichi Nishikoji, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/330,280

(22) Filed: Dec. 19, 2011

(65) Prior Publication Data

US 2012/0087109 A1 Apr. 12, 2012

Related U.S. Application Data

(62) Division of application No. 12/465,343, filed on May 13, 2009, now Pat. No. 8,081,271.

(30) Foreign Application Priority Data

Jul. 28, 2008 (JP) ................. 2008-194048
Aug. 22, 2008 (JP) ................. 2008-214429
Aug. 22, 2008 (JP) ................. 2008-214430

(51) Int. Cl.
*G02F 1/1335* (2006.01)

(52) U.S. Cl. ........................................... 349/64; 349/69

(58) Field of Classification Search .................... 349/64, 349/68

See application file for complete search history.

(56) References Cited

U.S. PATENT DOCUMENTS

| | | | |
|---|---|---|---|
| 7,638,754 B2 * | 12/2009 | Morimoto et al. | 250/226 |
| 7,868,969 B2 * | 1/2011 | Morimoto | 349/61 |
| 8,081,271 B2 * | 12/2011 | Kobayashi et al. | 349/64 |
| 2009/0289965 A1 | 11/2009 | Kurokawa et al. | |
| 2010/0141167 A1 | 6/2010 | Kato | |
| 2010/0271565 A1 | 10/2010 | Suminoe et al. | |

FOREIGN PATENT DOCUMENTS

| | | |
|---|---|---|
| JP | 2006-189665 | 7/2006 |
| JP | 2007-165632 | 6/2007 |
| JP | 2007-317423 | 12/2007 |

* cited by examiner

*Primary Examiner* — Rhonda Peace
(74) *Attorney, Agent, or Firm* — Hamre, Schumann, Mueller & Larson, P.C.

(57) ABSTRACT

A backlight apparatus is provided that enables a balance of brightness to be maintained over the entire area of a display screen and long life to be achieved. The surface of substrate 130 is opposite the rear surface of liquid crystal panel 110. LEDs 140 are placed on the surface of substrate 130. LED drive circuits 150 supply LEDs 140 with a current that causes LEDs 140 to emit light that illuminates liquid crystal panel 110. LED drive circuits 150 supply a lower current to LEDs 140 placed in an area having a higher ambient temperature within the surface area of substrate 130.

2 Claims, 26 Drawing Sheets

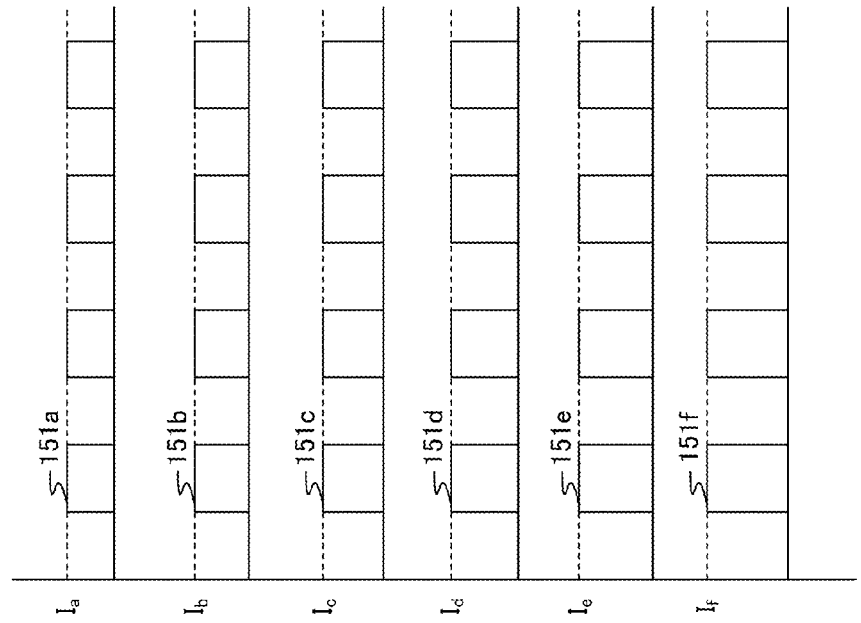
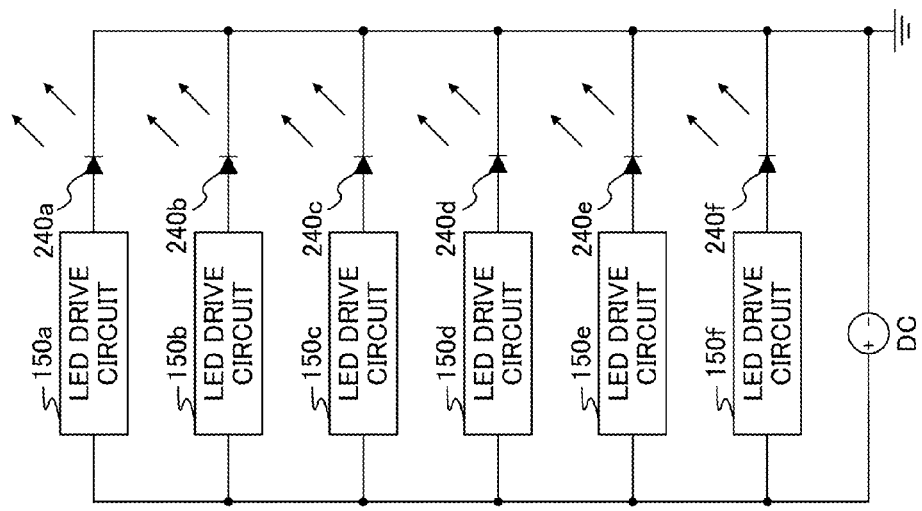
FIG.8B
FIG.8A

BACKLIGHT APPARATUS AND LIQUID CRYSTAL DISPLAY APPARATUS

CROSS REFERENCE TO RELATED APPLICATIONS

This application is a Divisional of application Ser. No. 12/465,343, filed May 13, 2009, which application is incorporated herein by reference.

The disclosures of Japanese Patent Application No. 2008-194048 filed on Jul. 28, 2008, No. 2008-214429 filed on Aug. 22, 2008, and No. 2008-214430 filed on Aug. 22, 2008, including the specifications, drawings and abstracts are incorporated herein by reference in their entirety.

BACKGROUND

1. Technical Field

The technical field relates to a backlight apparatus and liquid crystal display apparatus, and more particularly to an LED (light emitting diode) backlight apparatus in which a plurality of LEDs are placed and a liquid crystal display apparatus having this.

2. Description of the Related Art

There is one kind of liquid crystal display apparatus that illuminates a liquid crystal panel using an LED backlight apparatus (hereinafter referred to simply as "LED backlight").

Unexamined Japanese Patent Publication No. 2007-165632 describes an example of a conventional liquid crystal display apparatus that has an LED backlight. In this liquid crystal display apparatus, control is performed to increase the brightness of some of the LEDs provided in the backlight—for example LEDs placed in an area in which the ambient temperature is high, such as those close to a circuit with a large calorific value—by increasing the amount of drive current or the period for which that current is applied. Backlight brightness is made uniform by means of this control.

However, a property of an LED is that the higher its ambient temperature, the faster is the aging degradation of its brightness and the shorter is its life. Also, increasing the brightness of an LED by increasing its drive current amount or the like is a cause of aging degradation of LED brightness and shortened LED life.

Therefore, when control is performed to increase the drive current amount for LEDs placed in an area in which the ambient temperature is high, as in the case of an above-described conventional liquid crystal display apparatus, the aging degradation of those LEDs is more rapid than that of other LEDs. Consequently, as the cumulative illumination time of those LEDs increases, the brightness of those LEDs becomes lower than that of other LEDs. Therefore, uniformity of backlight brightness cannot be maintained over a long period. In other words, even if uniformity of brightness is maintained in the initial state, that balance is lost after a long period of use.

Also, even if the amount of drive current or the like is increased for LEDs whose brightness decreases to prevent a decrease in the brightness of those LEDs, there is a limit to the increase in the drive current amount, and a situation will eventually arise in which uniformity of brightness cannot be maintained.

SUMMARY

An object is to provide a backlight apparatus and a liquid crystal display apparatus that enable a balance of brightness to be maintained over the entire area of a display screen, and long life to be achieved. A further object is to provide a backlight apparatus and liquid crystal display apparatus that enable nonuniformity of brightness to be reduced in an outputting surface.

A backlight apparatus achieves the above objects by comprising a substrate having an opposed section opposite the rear surface of a liquid crystal panel, a plurality of light emitting diodes placed on the opposed section, and a current supplying section that supplies to the plurality of light emitting diodes a current that causes the plurality of light emitting diodes to emit light that illuminates the liquid crystal panel; and by having the current supplying section supply a lower current to a light emitting diode placed in an area having a higher ambient temperature within the area of the opposed section.

A backlight apparatus that is used in a liquid crystal display apparatus having a liquid crystal panel and a liquid crystal driver driving the liquid crystal panel, achieves the above objects by comprising a plurality of light emitting diodes placed facing the liquid crystal panel, and a current supplying section that supplies to the plurality of light emitting diodes a current that causes the plurality of light emitting diodes to emit light that illuminates the liquid crystal panel; and by having the current supplying section supply a lower current to a light emitting diode placed nearer the liquid crystal driver.

A backlight apparatus that is used in a liquid crystal display apparatus having a liquid crystal panel as a display screen, achieves the above objects by comprising a plurality of light emitting diodes placed facing the liquid crystal panel, and a current supplying section that supplies to the plurality of light emitting diodes a current that causes the plurality of light emitting diodes to emit light that illuminates the liquid crystal panel; and by having the current supplying section supply a lower current to a light emitting diode placed higher up in the vertical direction of the display screen.

A backlight apparatus that is used in a liquid crystal display apparatus having a liquid crystal panel and a liquid crystal driver driving the liquid crystal panel and a power supply section supplying power to the liquid crystal driver, achieves the above objects by comprising a plurality of light emitting diodes placed facing the liquid crystal panel, and a current supplying section that supplies to the plurality of light emitting diodes a current that causes the plurality of light emitting diodes to emit light that illuminates the liquid crystal panel; and by having the current supplying section supply a lower current to a light emitting diode placed nearer the power supply section.

A backlight apparatus that is used in a liquid crystal display apparatus having a liquid crystal panel as a display screen, achieves the above objects by comprising a plurality of light emitting diodes placed facing the liquid crystal panel, and a current supplying section that supplies to the plurality of light emitting diodes a current that causes the plurality of light emitting diodes to emit light that illuminates the liquid crystal panel; and by having the plurality of light emitting diodes form a plurality of arrays, wherein the plurality of arrays are formed respectively by two or more light emitting diodes arrayed in the vertical direction of the display screen, and are spaced at equal intervals in the horizontal direction of the display screen, and light emitting diodes placed higher up in the vertical direction of the display screen are placed with higher density adjacent to another light emitting diode forming the same array; and by having the current supplying section supply a lower current to a light emitting diode placed higher up in the vertical direction of the display screen.

A backlight apparatus that is used in a liquid crystal display apparatus having a liquid crystal panel as a display screen, achieves the above objects by comprising a plurality of light emitting diodes placed facing the liquid crystal panel, and a current supplying section that supplies to the plurality of light emitting diodes a current that causes the plurality of light emitting diodes to emit light that illuminates the liquid crystal panel; and by having the plurality of light emitting diodes form a plurality of arrays, wherein the plurality of arrays are formed respectively by two or more light emitting diodes arrayed in the horizontal direction of the display screen, and are spaced at equal intervals in the vertical direction of the display screen, and light emitting diodes placed higher up in the vertical direction of the display screen are placed with higher density adjacent to another light emitting diode composing the same array; and by having the current supplying section supply a lower current to a light emitting diode placed higher up in the vertical direction of the display screen.

A backlight apparatus that is used in a liquid crystal display apparatus having a liquid crystal panel as a display screen, achieves the above objects by comprising a substrate having an opposed section placed opposite the rear surface side of the liquid crystal panel, a plurality of light emitting diodes placed with nonuniform placement density on the opposed section, a diffuser plate upon which light emitted from the plurality of light emitting diodes is input and that has a diffusing action on the input light and outputs diffused light toward the liquid crystal panel side, and a current supplying section that supplies to the plurality of light emitting diodes a current that causes the plurality of light emitting diodes to emit light that illuminates the liquid crystal panel; and by having the current supplying section supply a lower current to a light emitting diode placed in an area having a higher ambient temperature within the area of the opposed section, wherein light emitting diodes to which a lower current is supplied are placed with higher density adjacent to another light emitting diode, and the distance between the opposed section and the diffuser plate is greater the lower the placement density of a position.

A backlight apparatus that is used in a liquid crystal display apparatus having a liquid crystal panel as a display screen, achieves the above objects by comprising a substrate having an opposed section placed opposite the rear surface side of the liquid crystal panel, a plurality of light emitting diodes placed with nonuniform placement density on the opposed section, a diffuser plate upon which light emitted from the plurality of light emitting diodes is input and that has a diffusing action on the input light and outputs diffused light toward the liquid crystal panel side, and a current supplying section that supplies to the plurality of light emitting diodes a current that causes the plurality of light emitting diodes to emit light that illuminates the liquid crystal panel; and by having the current supplying section supply a lower current to a light emitting diode placed higher up in the vertical direction of the display screen, wherein light emitting diodes to which a lower current is supplied are placed with higher density adjacent to another light emitting diode, and the distance between the opposed section and the diffuser plate is greater the lower the placement density of a position.

A backlight apparatus that is used in a liquid crystal display apparatus having a liquid crystal panel as a display screen, achieves the above objects by comprising a substrate having an opposed section placed opposite the rear surface side of the liquid crystal panel, a plurality of light emitting diodes placed with nonuniform placement density on the opposed section, a diffuser plate upon which light emitted from the plurality of light emitting diodes is input and that has a diffusing action on the input light and outputs diffused light toward the liquid crystal panel side, and a current supplying section that supplies to the plurality of light emitting diodes a current that causes the plurality of light emitting diodes to emit light that illuminates the liquid crystal panel; and by having the current supplying section supply a lower current to a light emitting diode placed in an area having a higher ambient temperature within the area of the opposed section, wherein light emitting diodes to which a lower current is supplied are placed with higher density adjacent to another light emitting diode, and light emitted from the light emitting diodes is more widely distributed the lower the placement density of a position.

A backlight apparatus that is used in a liquid crystal display apparatus having a liquid crystal panel as a display screen, achieves the above objects by comprising a substrate having an opposed section placed opposite the rear surface side of the liquid crystal panel, a plurality of light emitting diodes placed with nonuniform placement density on the opposed section, a diffuser plate upon which light emitted from the plurality of light emitting diodes is input and that has a diffusing action on the input light and outputs diffused light toward the liquid crystal panel side, and a current supplying section that supplies to the plurality of light emitting diodes a current that causes the plurality of light emitting diodes to emit light that illuminates the liquid crystal panel; and by having the current supplying section supply a lower current to a light emitting diode placed higher up in the vertical direction of the display screen, wherein light emitting diodes to which a lower current is supplied are placed with higher density adjacent to another light emitting diode, and light emitted from the light emitting diodes is more widely distributed the lower the placement density of a position.

BRIEF DESCRIPTION OF THE DRAWINGS

The above and other objects and features of the invention will appear more fully hereinafter from a consideration of the following description taken in conjunction with the accompanying drawings wherein examples are illustrated by way of example, in which:

FIG. 8A is a circuit diagram showing the configuration of an LED drive section according to Embodiment 2 of the present invention;

FIG. 8B is a waveform diagram showing drive signals according to Embodiment 2 of the present invention;

DETAILED DESCRIPTION OF THE PREFERRED EMBODIMENTS

With reference now to the accompanying drawings, embodiments of the present invention will be explained in detail below.

Embodiment 1

Figure 1:
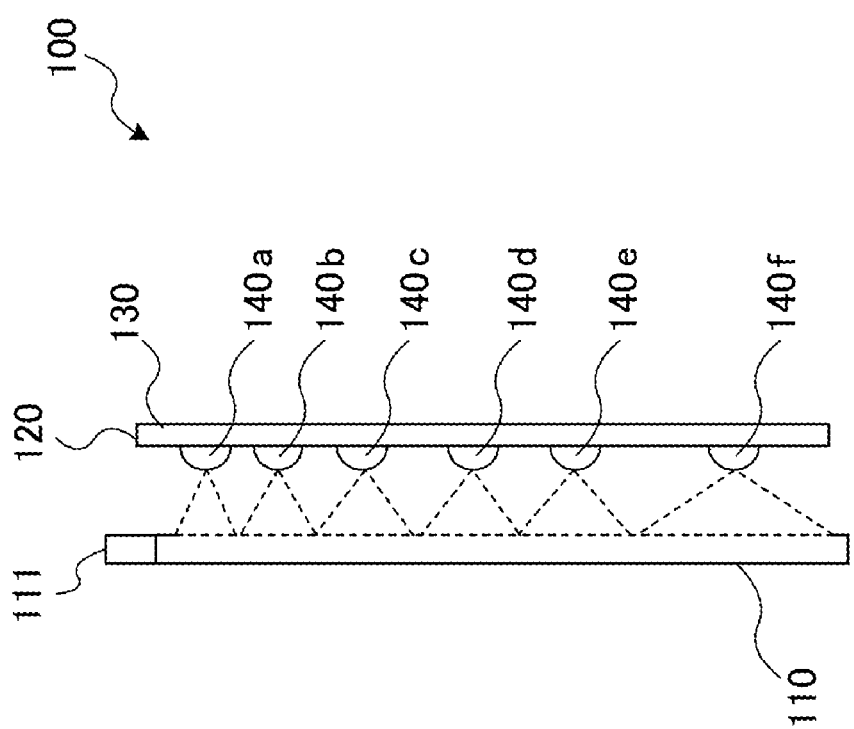
FIG. 1 is a side view of the principal parts of a liquid crystal display apparatus according to Embodiment 1 of the present invention.

FIG. 1 is a side view of the principal parts of a liquid crystal display apparatus according to Embodiment 1 of the present invention.

Liquid crystal display apparatus 100 has liquid crystal panel 110, liquid crystal driver 111, and LED backlight 120 as main components.

Liquid crystal panel 110 is a transmissive or semi-transmissive liquid crystal panel. Liquid crystal panel 110 transmits light emitted from LED backlight 120, and emits this transmitted light from the front surface of the display screen.

Liquid crystal driver 111 is placed in proximity to the upper edge of liquid crystal panel 110. In the descriptions of all the embodiments, "upper" means upper in the vertical direction of the display screen (hereinafter referred to simply as "vertical direction"), and in FIG. 1 corresponds to the top of the drawing in the vertical direction.

Liquid crystal driver 111 controls a drive voltage that drives liquid crystal panel 110 based on a video signal that is a digital signal indicating video to be displayed on the display screen of liquid crystal panel 110, and thereby controls the transmittance of liquid crystal panel 110. As a result of this control, liquid crystal panel 110 displays video.

Liquid crystal driver 111 may be placed in a position other than the above. For example, liquid crystal driver 111 may be placed in proximity to the lower edge, left-hand edge, or right-hand edge of liquid crystal panel 110, or elsewhere. In the descriptions of all the embodiments, "lower" means lower in the vertical direction, and "left" and "right" mean left and right in the horizontal direction of the display screen (hereinafter referred to simply as "horizontal direction").

LED backlight 120 has substrate 130 placed on the rear surface side of liquid crystal panel 110. The surface of substrate 130 is an opposed section opposite the rear surface of liquid crystal panel 110, and LEDs 140a, 140b, 140c, 140d, 140e, and 140f are arrayed on this surface in approximately flat form facing the rear surface of liquid crystal panel 110. That is to say, LED backlight 120 is a subjacent type of backlight apparatus.

Generally, a subjacent type of backlight apparatus has a sealed structure that can prevent the infiltration of dust or dirt, but LED backlight 120 may or may not employ a sealed structure.

LED backlight 120 illuminates liquid crystal panel 110 with light emitted from LEDs 140a, 140b, 140c, 140d, 140e, and 140f. In the following description, LEDs 140a, 140b, 140c, 140d, 140e, and 140f are referred to simply as "LED(s) 140" when described without any particular differentiation.

LED backlight 120 also has an LED drive section that drives LEDs 140, described later herein.

Here, LEDs 140 are white LEDs that emit white light when driven by a drive signal applied from an LED drive section described later herein. For example, when LEDs 140 are LED apparatuses having mainly a monochromatic (for example, blue) LED and a fluorescent material, LEDs 140 are configured so that light emitted from a monochromatic LED when a drive signal is applied is transmitted through the fluorescent material and becomes white light through the action of the fluorescent material.

LEDs 140 may also employ another configuration, such as a combination of LEDs of three colors—R (red), G (green), and B (blue).

The width of the angle of divergence of each LED 140 is set in accordance with the interval between adjacent LEDs 140 so that LED backlight 120 uniformly illuminates the entire area of the display screen.

Figure 2:
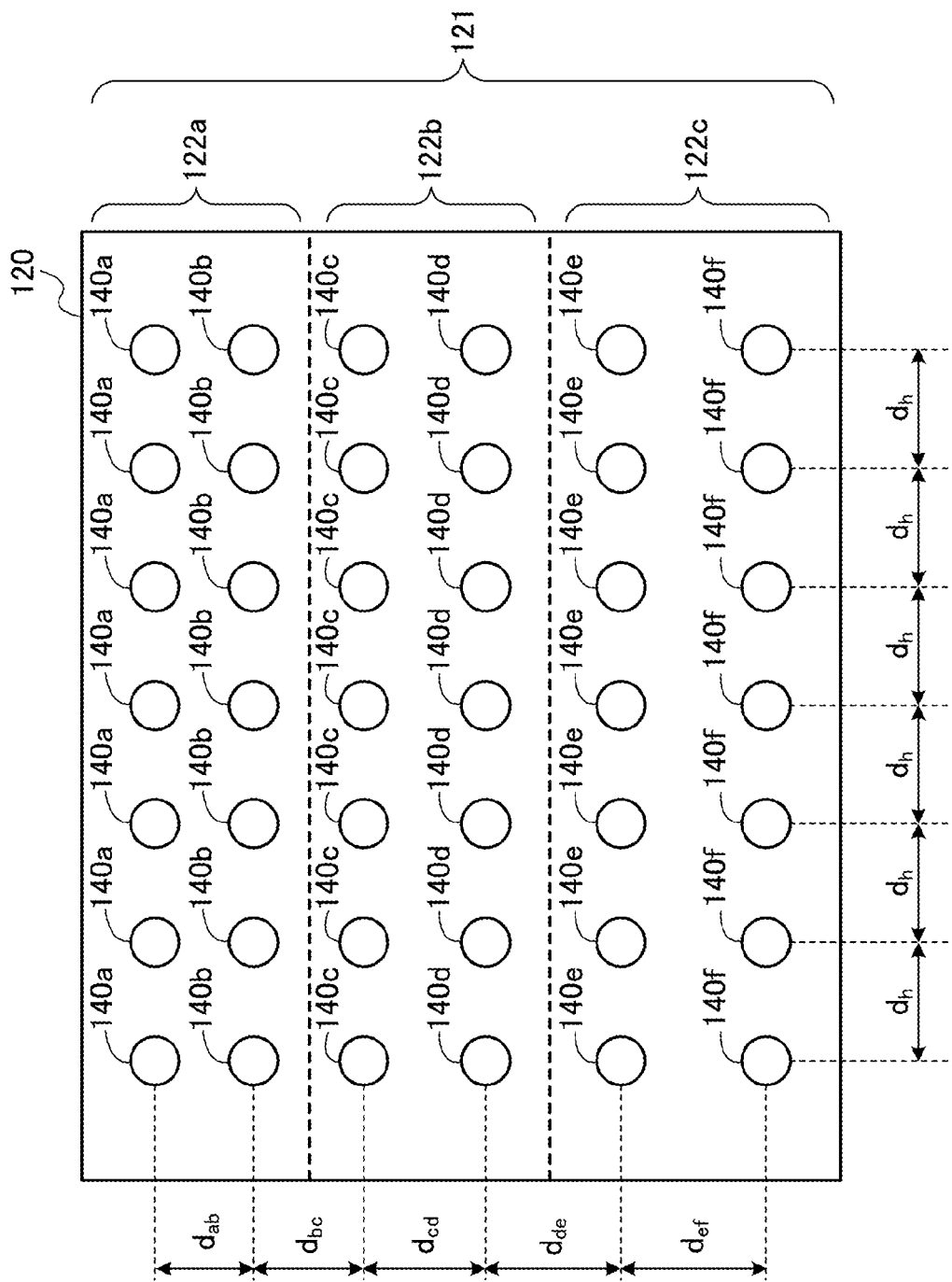
FIG. 2 is a drawing showing an LED array of an LED backlight according to Embodiment 1 of the present invention.

FIG. 2 is a drawing showing the placement of LEDs 140 in LED backlight 120.

LEDs 140 are placed so as to form a plurality of arrays on surface area 121 of LED backlight 120. The formed plurality of arrays are vertical-direction arrays extending in the vertical direction, and in each vertical-direction array, one LED 140a, one LED 140b, one LED 140c, one LED 140d, one LED 140e, and one LED 140f are placed in a straight line in the vertical direction.

In the horizontal direction, there is an equal interval (pitch $d_h$) between the vertical-direction arrays.

In the vertical direction, LEDs 140 placed in area 122a located at the top are placed most densely, LEDs 140 placed in area 122c located at the bottom are placed least densely, and LEDs 140 placed in area 122b located in the middle are placed with medium density. To be more specific, pitch $d_{ab}$ between LED 140a and LED 140b is smaller than pitch $d_{bc}$ between LED 140b and LED 140c, pitch $d_{bc}$ is smaller than pitch $d_{cd}$ between LED 140c and LED 140d, pitch $d_{cd}$ is smaller than pitch $d_{de}$ between LED 140d and LED 140e, and pitch $d_{de}$ is smaller than pitch $d_{ef}$ between LED 140d and LED 140f.

Figure 3B:
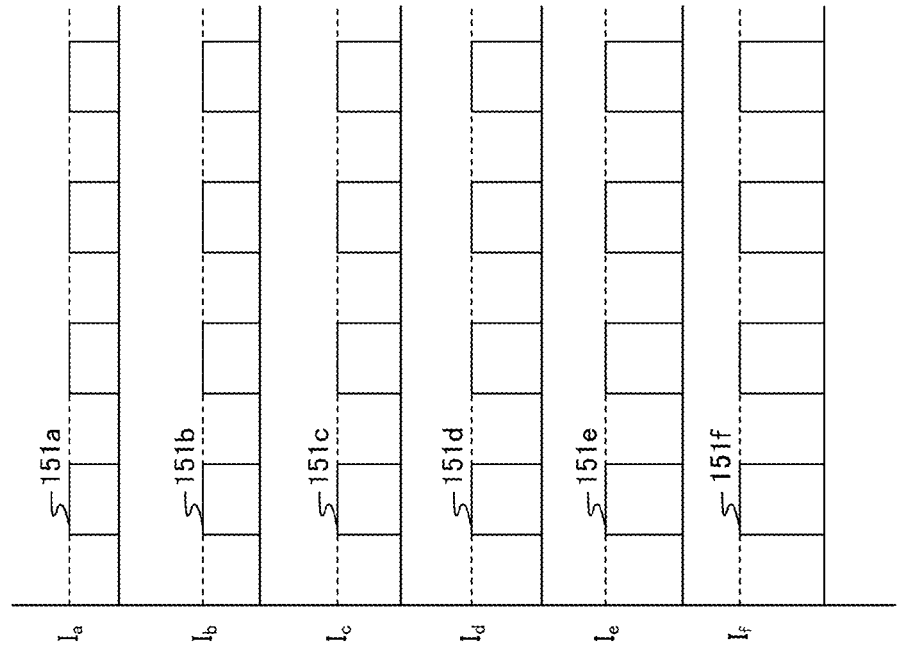
FIG. 3B is a waveform diagram showing drive signals according to Embodiment 1 of the present invention.
Figure 3A:
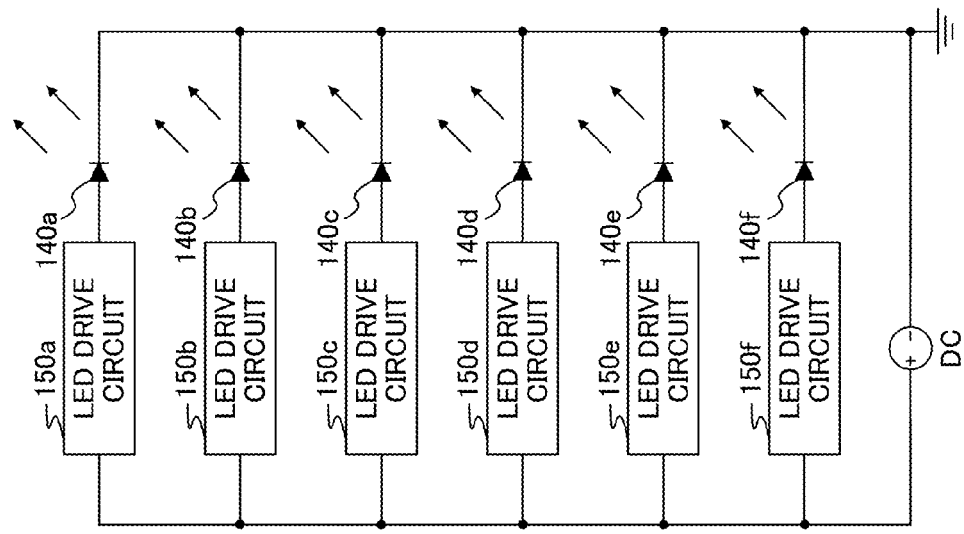
FIG. 3A is a circuit diagram showing the configuration of an LED drive section according to Embodiment 1 of the present invention.

FIG. 3A and FIG. 3B are drawings for explaining an LED drive section in LED backlight 120. FIG. 3A is a circuit diagram showing an example of the configuration of the LED drive section, and FIG. 3B is a waveform diagram showing an example of drive signals generated by the LED drive section and supplied to LEDs 140.

The LED drive section has LED drive circuits 150a, 150b, 150c, 150d, 150e, and 150f. In the following description, LED drive circuits 150a, 150b, 150c, 150d, 150e, and 150f are referred to simply as "LED drive circuit(s) 150" when described without any particular differentiation.

LED drive circuit 150a supplies drive signal 151a having preset current value $I_a$ to one LED 140a as a current supplying section. LED drive circuit 150b supplies drive signal 151b having current value $I_b$ to one LED 140b as a current supplying section. LED drive circuit 150c supplies drive signal 151c having current value $I_c$ to one LED 140c as a current supplying section. LED drive circuit 150d supplies drive signal 151d having current value $I_d$ to one LED 140d as a current supplying section. LED drive circuit 150e supplies drive signal 151e having current value $I_e$ to one LED 140e as a current supplying section. LED drive circuit 150f supplies drive signal 151f having current value $I_f$ to one LED 140f as a current supplying section.

Although not shown in FIG. 3A, the LED drive section has the same number of LED drive circuits 150 (as current supplying sections) as LEDs 140. Each LED drive circuit 150 supplies a drive signal to one LED 140. By means of this configuration, each LED 140a is supplied with drive signal 151a having current value $I_a$, each LED 140b is supplied with drive signal 151b having current value $I_b$, each LED 140c is supplied with drive signal 151c having current value $I_c$, each LED 140d is supplied with drive signal 151d having current value $I_d$, each LED 140e is supplied with drive signal 151e having current value $I_e$, and each LED 140f is supplied with drive signal 151f having current value $I_f$.

Here, current value $I_a$ is smaller than current value $I_b$, current value $I_b$ is smaller than current value $I_c$, current value $I_c$ is smaller than current value $I_d$, current value $I_d$ is smaller than current value $I_e$, and current value $I_e$ is smaller than current value $I_f$. Drive signals 151a, 151b, 151c, 151d, 151e, and 151f all have the same duty cycle.

That is to say, among LEDs 140, those placed higher up and located nearer liquid crystal driver 111 are supplied with a lower current.

The current value of each LED 140 is set optimally based on the temperature distribution in surface area 121 of LED backlight 120. For example, in an area (for example, area 122a) shown as a high-temperature area in the temperature distribution for a reason such as being located comparatively high up, or being located comparatively near liquid crystal driver 111, an LED 140 current value is set comparatively low. And in an area (122c) shown as a low-temperature area in the temperature distribution for a reason such as being located comparatively low down, or being located comparatively far from liquid crystal driver 111, an LED 140 current value is set comparatively high. These settings are made in such a way that the junction temperature becomes equal in all LEDs 140.

By this means, among LEDs 140, those placed higher up and located nearer liquid crystal driver 111 emit light at lower brightness. When this kind of drive control is performed, a difference in brightness may occur between individual LEDs 140. However, since the junction temperatures of all LEDs 140 are equal, no difference in aging degradation progress occurs between individual LEDs 140. Therefore, even if there is a difference in brightness between LEDs 140, such a balance of brightness is maintained unchanged over a long period.

Also, among LEDs 140, those placed higher up, located nearer liquid crystal driver 111, and supplied with a lower current, are placed with higher density adjacent to another LED 140 forming the same array. For example, the number and placement positions of LEDs 140 of predetermined areas (for example, areas 122a, 122b, and 122c) are set in such a way that luminous flux is equal for each of those predetermined areas.

By this means, uniformity of brightness is realized over the entire area of the display screen, and is maintained unchanged over a long period.

Next, the brightness correction method used in liquid crystal display apparatus 100 will be described.

It is possible to obtain the same kind of effect by making current values I the same, making the duty cycle of drive signal 151a smaller than that of drive signal 151b, making the duty cycle of drive signal 151b smaller than that of drive signal 151c, making the duty cycle of drive signal 151c smaller than that of drive signal 151d, making the duty cycle of drive signal 151d smaller than that of drive signal 151e, and making the duty cycle of drive signal 151e smaller than that of drive signal 151f.

Figure 4:
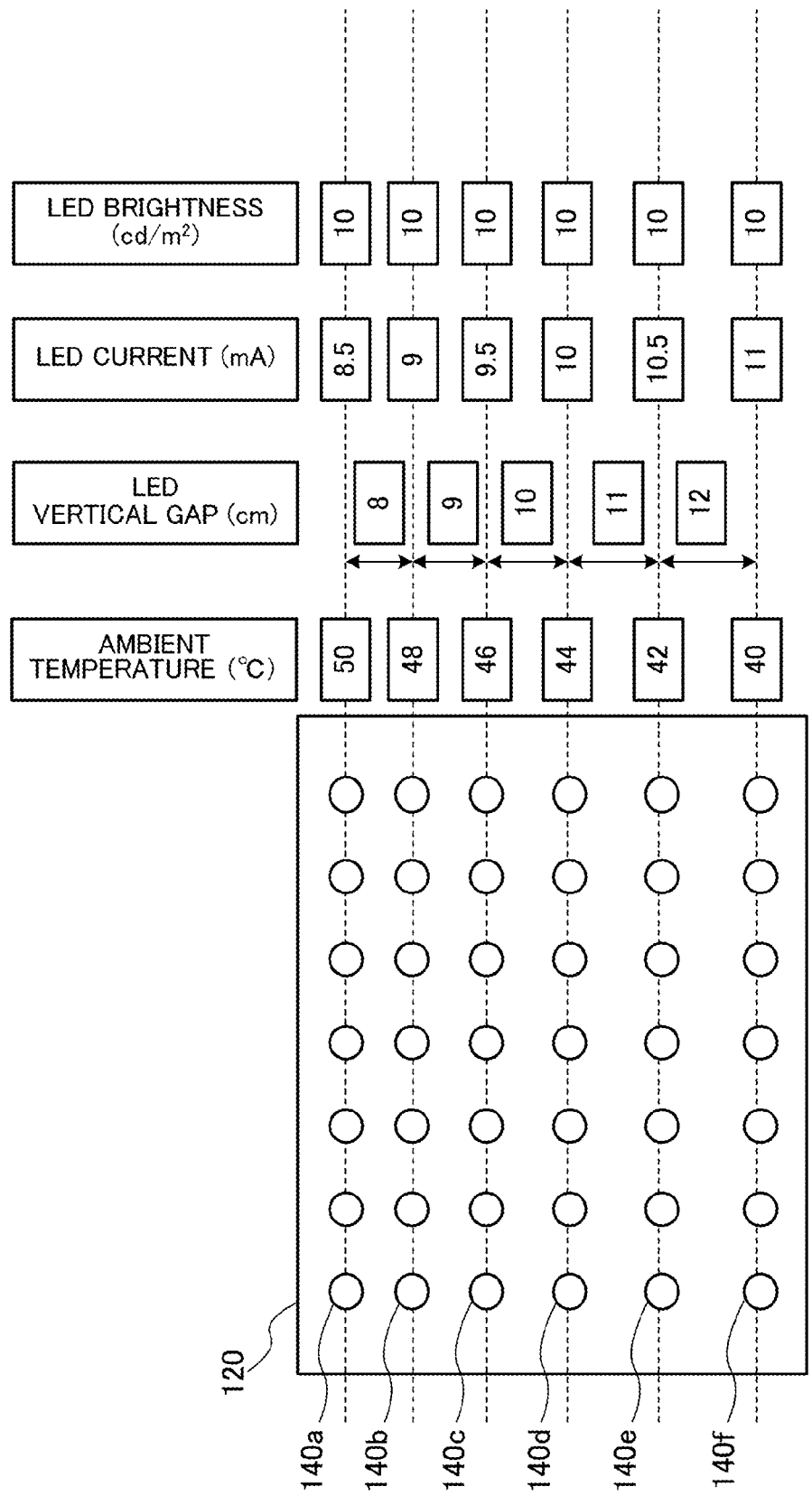
FIG. 4 is a drawing showing a brightness correction method according to Embodiment 1 of the present invention.

FIG. 4 is a drawing for explaining the brightness correction method used in liquid crystal display apparatus 100. Here, a case is described by way of example in which the ambient temperature of an area located higher up becomes higher during LED 140 illumination.

LEDs 140 are placed with higher density the higher their placement position. Simply by employing this kind of LED placement, a difference in a decrease in LED 140 brightness due to a difference in ambient temperature can be corrected, and brightness can be made uniform over the entire area of the display screen. This is possible even if drive signals with the same current value are supplied to all LEDs 140.

However, in this embodiment, LED placement is decided in such a way that supposing that drive signals with the same current value are supplied to all LEDs 140, brightness is higher in an area higher up in the display screen. Thus, when this kind of LED placement is employed, LEDs 140 are supplied with a lower current the higher their placement position. By this means, brightness in the LED 140a illumination area (that is, the area of the display screen illuminated by light emitted from all LEDs 140a), brightness in the LED 140b illumination area, brightness in the LED 140c illumination area, brightness in the LED 140d illumination area, brightness in the LED 140e illumination area, and brightness in the LED 140f illumination area, become uniform.

Figure 5:
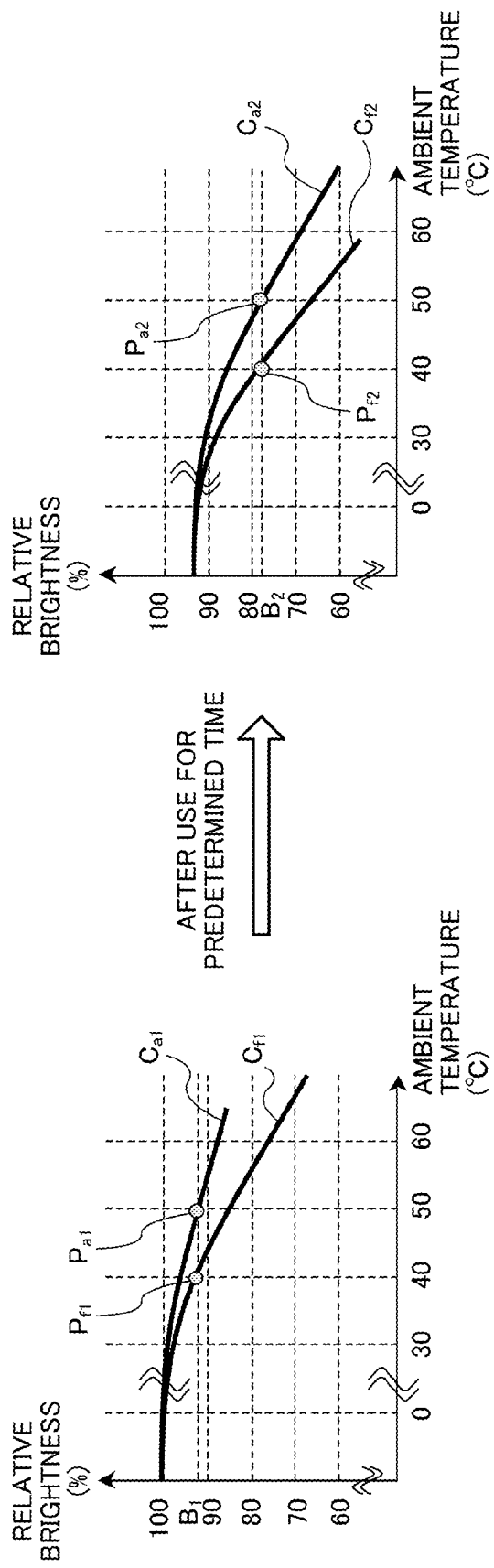
FIG. 5A is a drawing showing the relationship between ambient temperature and relative brightness for an initial-state LED backlight according to Embodiment 1 of the present invention.
FIG. 5B is a drawing showing the relationship between ambient temperature and relative brightness for an LED backlight after a predetermined elapse of time according to Embodiment 1 of the present invention.

The effect of the brightness correction method shown in FIG. 4 will now be described in greater detail with reference to FIG. 5A and FIG. 5B. FIG. 5A shows an example of the relationship between ambient temperature and relative brightness for initial-state LED backlight 120, and FIG. 5B shows an example of the relationship between ambient temperature and relative brightness for LED backlight 120 after use for a predetermined time (for example, 10,000 hours). To simplify the explanation, only LEDs 140a and 140f are compared.

Warm air from lower areas collects around LEDs 140a placed in an upper area, and the temperature rises. This is because liquid crystal display apparatus 100 is generally used in an upright position. Also, the fact that LEDs 140a are placed near liquid crystal driver 111, which generates heat during operation, causes the ambient temperature of LEDs 140a to rise compared with that of LEDs 140f. Therefore, the brightness of LEDs 140a themselves is lower than that of LEDs 140f.

Furthermore, LEDs 140a are supplied with a lower current than LEDs 140f (in the example shown in FIG. 4, 8.5 mA for LEDs 140a compared with 11 mA for LEDs 140f). This is a further cause of the brightness of LEDs 140a themselves becoming lower than that of LEDs 140f.

However, while LEDs 140a are placed with high density with respect to LEDs 140b (in the example shown in FIG. 4, the vertical interval (pitch) between LEDs 140a and 140b is 8 mm), LEDs 140f are placed with low density with respect to LEDs 140e (in the example shown in FIG. 4, the vertical interval (pitch) between LEDs 140e and 140f is 12 mm).

Consequently, in the initial state, characteristics are obtained whereby brightness in the LED 140a illumination area falls relatively gently (curve $C_{a1}$) as the ambient temperature of LEDs 140a rises, and brightness in the LED 140f illumination area falls relatively markedly (curve $C_{f1}$) as the ambient temperature of LEDs 140f rises.

In this case, when LED backlight 120 is turned on, the ambient temperature of LEDs 140a becomes 50° C., and relative brightness in the LED 140a illumination area becomes $B_1$% (point $P_{a1}$). Meanwhile, the ambient temperature of LEDs 140f becomes 40° C., and relative brightness in the LED 140f illumination area becomes $B_1$% (point $P_{f1}$). Thus, brightness is uniform over the entire area of the display screen.

When the cumulative usage time of LED backlight 120 reaches a predetermined time, characteristics are obtained whereby brightness in the LED 140a illumination area falls relatively gently (curve $C_{a2}$) as the ambient temperature of LEDs 140a rises, and brightness in the LED 140f illumination area falls relatively markedly (curve $C_{f2}$) as the ambient temperature of LEDs 140f rises. Here, comparing curve $C_{a1}$ and curve $C_{f1}$ in FIG. 5A with curve $C_{a2}$ and curve $C_{f2}$ in FIG. 53, it can be seen that aging degradation has occurred in brightness for both LEDs 140a and LEDs 140f.

In this case, when LED backlight 120 is turned on, the ambient temperature of LEDs 140a becomes 50° C., and relative brightness in the LED 140a placement area becomes $B_2$% (point $P_{a2}$). Meanwhile, the ambient temperature of LEDs 140f becomes 40° C., and relative brightness in the LED 140f placement area becomes $B_2$% (point $P_{f2}$). That is to say, although aging degradation of brightness has occurred in both areas, since the degree of progress is the same for both, uniformity of brightness is maintained over the entire area of the display screen. This is because the progress of aging degradation of LEDs 140 is slowed by supplying a relatively low current to LEDs 140 (in this example, LEDs 140a) whose aging degradation should be relatively rapid due to the fact that the ambient temperature is relatively high.

As described above, according to this embodiment, a lower current is supplied to LEDs 140 placed in an area with a higher ambient temperature within surface area 121 of substrate 130 of LED backlight 120. By this means, the progress of aging degradation of all LEDs 140 provided in LED backlight 120 is made uniform. Therefore, the balance of brightness over the entire area of the display screen can be maintained over a long period. Also, according to this embodiment, control to slow aging degradation (that is, supply of a relatively low current) is performed for those of LEDs 140 for which aging degradation should be relatively rapid due to a relatively high ambient temperature. Therefore, the life of LED backlight 120 can be prolonged.

Furthermore, according to this embodiment, since array gaps are uniform in the horizontal direction and LED 140 gaps are nonuniform in the vertical direction, there is an advantage of being able to achieve commonality of LED drive control circuitry due to the fact that the number of horizontal LEDs is the same.

In this embodiment, a case has been described by way of example in which the ambient temperature of an area higher up is higher, and a configuration has been described in which LEDs 140 placed in an area higher up are placed with higher density, and are driven by a lower current. However, other configurations are also possible.

For example, if liquid crystal driver 111 is placed in proximity to the lower edge of liquid crystal panel 110, so that the ambient temperature of a lower area becomes higher than that of an area above, a configuration can be employed in which LEDs 140 placed in a lower area are placed with higher density, and are driven by a lower current.

Also, if liquid crystal driver 111 is placed in proximity to the left-hand edge of liquid crystal panel 110, so that the ambient temperature of an area to the left becomes higher than that of an area to the right, a configuration can be employed in which LEDs 140 placed in an area to the left are placed with higher density, and are driven by a lower current.

Also, if liquid crystal driver 111 is placed in proximity to the right-hand edge of liquid crystal panel 110, so that the ambient temperature of an area to the right becomes higher than that of an area to the left, a configuration can be employed in which LEDs 140 placed in an area to the right are placed with higher density, and are driven by a lower current.

Essentially, when the ambient temperature of an area near liquid crystal driver 111 becomes higher than the ambient temperature of an area farther away, a configuration can be employed in which LEDs 140 placed in the former area are placed with higher density, and are driven by a lower current.

Exactly the same applies to a power supply section—that is, power supply circuitry supplying power to liquid crystal driver 111, LED drive circuits 150, and so forth—and to other heat-generating members, as to liquid crystal driver 111. This is because a power supply section and the like also generate heat. Thus, the placement and drive current values of LEDs 140 can be decided according to the placement positions of a power supply section and so forth.

Even if there is temperature distribution such that the ambient temperature of an area higher up does not become higher due to the internal structure of liquid crystal display apparatus 100, the placement and drive current values of LEDs 140 can still be decided based on that temperature distribution.

In this embodiment, LEDs 140 are white LEDs, but the same kind of effect as described above can also be realized if LEDs 140 are a combination of LEDs of three colors—R (red), G (green), and B (blue). In this case, a configuration is employed in which more red LEDs, which decrease greatly in brightness due to temperature, are placed in a high-temperature area than green or blue LEDs. By this means, the color temperature balance can also be maintained over a long period.

According to this embodiment, LEDs 140 are placed so as to form linear arrays, but the LED 140 placement scheme is not limited to this. Various kinds of placement schemes can be employed, such as placing LEDs 140 so as to form zigzag arrays, for example.

If illumination of LED backlight 120 is interlinked with a liquid crystal panel 110 screen display scan and a backlight scan is performed to improve liquid crystal moving image performance, it is necessary to take account of the fact that the pitch differs in the LED vertical direction, and perform control of the LED backlight 120 illumination start time interlinked with the scan.

Embodiment 2

Figure 6:
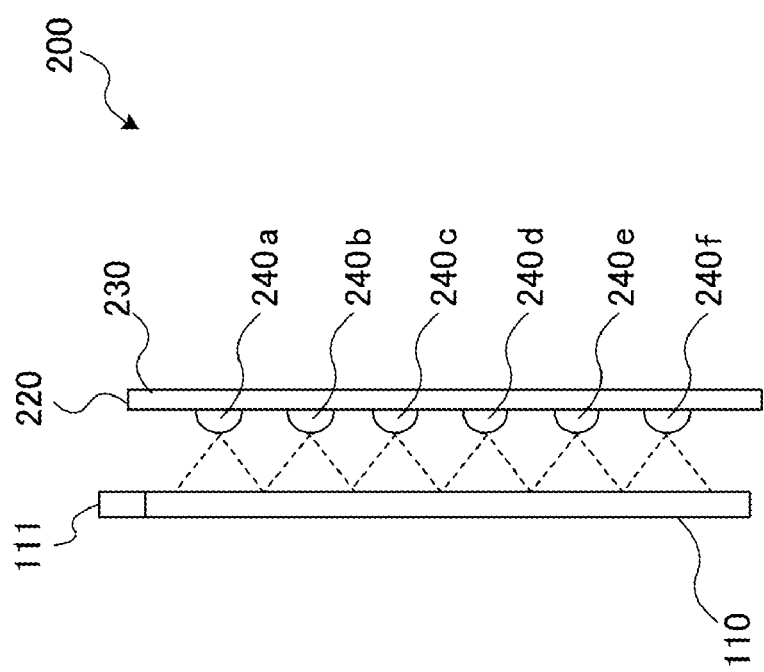
FIG. 6 is a side view of the principal parts of a liquid crystal display apparatus according to Embodiment 2 of the present invention.

FIG. 6 is a side view of the principal parts of a liquid crystal display apparatus according to Embodiment 2 of the present invention. Configuration elements identical to those in Embodiment 1 are assigned the same reference codes as in Embodiment 1, and detailed descriptions thereof are omitted here.

This embodiment differs from Embodiment 1 in the LED placement scheme.

Liquid crystal display apparatus 200 has liquid crystal panel 110, liquid crystal driver 111, and LED backlight 220 as main components.

LED backlight 220 has substrate 230 placed on the rear surface side of liquid crystal panel 110. The surface of substrate 230 is an opposed section opposite the rear surface of liquid crystal panel 110, and LEDs 240a, 240b, 240c, 240d, 240e, and 240f are arrayed on this surface in approximately flat form facing the rear surface of liquid crystal panel 110. That is to say, LED backlight 220 is a subjacent type of backlight apparatus.

Generally, a subjacent type of backlight apparatus has a sealed structure that can prevent the infiltration of dust or dirt, but LED backlight 220 may or may not employ a sealed structure.

LED backlight 220 illuminates liquid crystal panel 110 with light emitted from LEDs 240a, 240b, 240c, 240d, 240e, and 240f. In the following description, LEDs 240a, 240b, 240c, 240d, 240e, and 240f are referred to simply as "LED(s) 240" when described without any particular differentiation.

LED backlight 220 also has an LED drive section that drives LEDs 240, described later herein.

Here, LEDs 240 are white LEDs that emit white light when driven by a drive signal applied from an LED drive section described later herein. For example, when LEDs 240 are LED apparatuses having mainly a monochromatic (for example, blue) LED and a fluorescent material, LEDs 240 are configured so that light emitted from a monochromatic LED when a drive signal is applied is transmitted through the fluorescent material and becomes white light through the action of the fluorescent material. LEDs 240 may also employ another configuration, such as a combination of LEDs of three colors—R (red), G (green), and B (blue).

The width of the angle of divergence of each LED 240 is set in accordance with the interval between adjacent LEDs 240 so that LED backlight 220 uniformly illuminates the entire area of the display screen.

Figure 7:
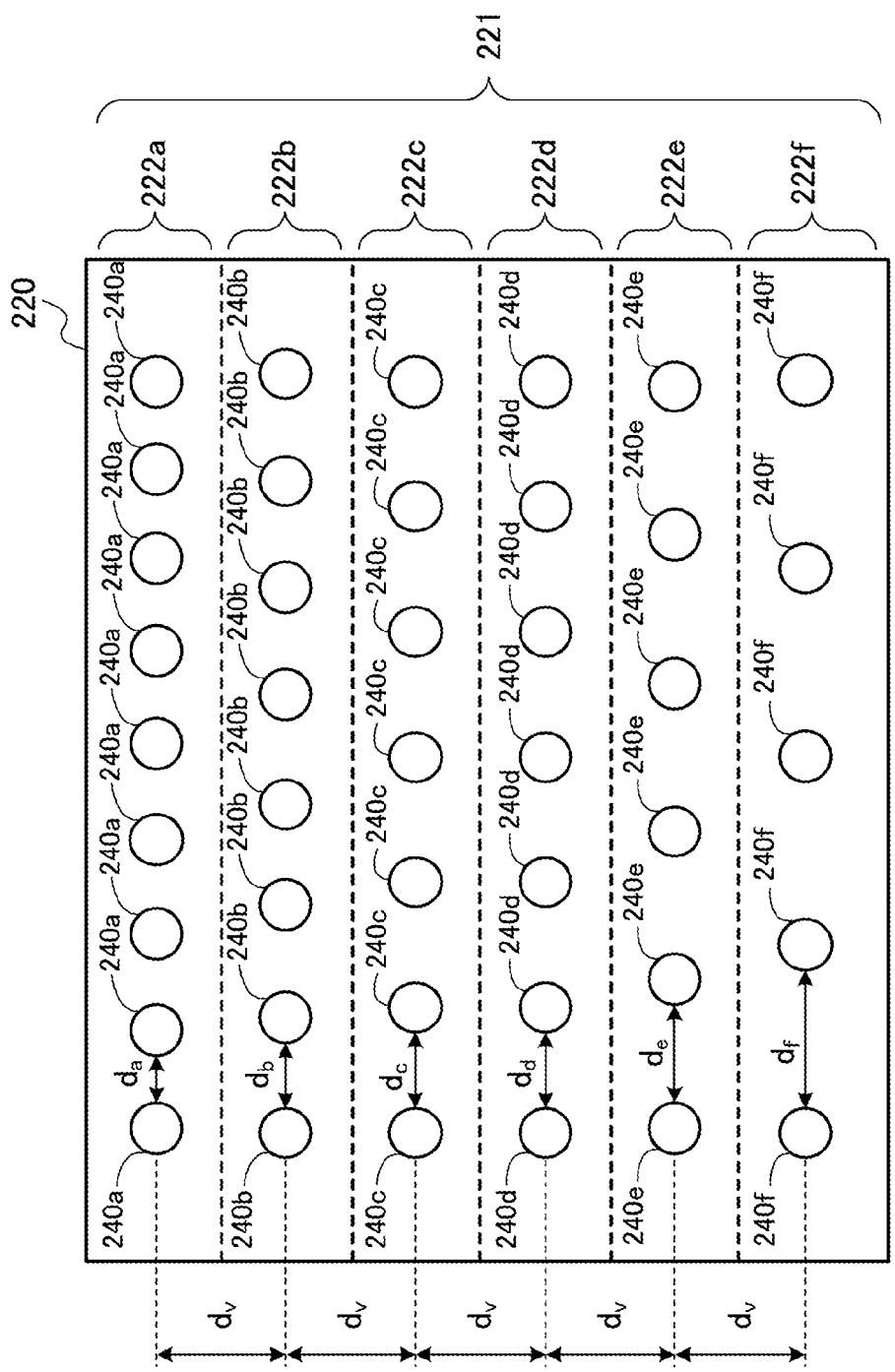
FIG. 7 is a drawing showing an LED array of an LED backlight according to Embodiment 2 of the present invention.

FIG. 7 is a drawing showing the placement of LEDs 240 in LED backlight 220.

LEDs 240 are placed so as to form a plurality of arrays on surface area 221 of LED backlight 220. The formed plurality of arrays are horizontal-direction arrays extending in the horizontal direction, with all LEDs 240a placed linearly in the horizontal direction, all LEDs 240b placed linearly in the horizontal direction, all LEDs 240c placed linearly in the horizontal direction, all LEDs 240d placed linearly in the horizontal direction, all LEDs 240e placed linearly in the horizontal direction, and all LEDs 240f placed linearly in the horizontal direction.

In the vertical direction, there is an equal interval (pitch $d_v$) between the horizontal-direction arrays.

In the horizontal direction, the placement density of LEDs 240a in area 222a located at the top is highest, the placement density of LEDs 240b in area 222b therebelow is next highest, the placement density of LEDs 240c in area 222c therebelow is next highest, the placement density of LEDs 240d in area 222d therebelow is next highest, the placement density of LEDs 240e in area 222e therebelow is next highest, and the placement density of LEDs 240f in area 222f at the bottom is lowest. In other words, pitch $d_a$ between LEDs 240a is smaller than pitch $d_b$ between LEDs 240b, pitch $d_b$ is smaller than pitch $d_c$ between LEDs 240c, pitch $d_c$ is smaller than pitch $d_d$ between LEDs 240d, pitch $d_d$ is smaller than pitch $d_e$ between LEDs 240e, and pitch $d_e$ is smaller than pitch $d_f$ between LEDs 240f.

FIG. 8A and FIG. 8B are drawings for explaining an LED drive section in LED backlight 220. FIG. 8A is a circuit diagram showing an example of the configuration of the LED drive section, and FIG. 8B is a waveform diagram showing an example of drive signals generated by the LED drive section and supplied to LEDs 240.

In the LED drive section shown in FIG. 8A and FIG. 8B, LED drive circuit 150a supplies drive signal 151a having preset current value $I_a$ to one LED 240a as a current supplying section; LED drive circuit 150b supplies drive signal 151b having current value $I_b$ to one LED 240b as a current supplying section; LED drive circuit 150c supplies drive signal 151c having current value $I_c$ to one LED 240c as a current supplying section; LED drive circuit 150d supplies drive signal 151d having current value $I_d$ to one LED 240d as a current supplying section; LED drive circuit 150e supplies drive signal 151e having current value $I_e$ to one LED 240e as a current supplying section; and LED drive circuit 150f supplies drive signal 151f having current value $I_f$ to one LED 240f as a current supplying section.

Although not shown in FIG. 8A, the LED drive section has the same number of LED drive circuits 150 (as current supplying sections) as LEDs 240. Each LED drive circuit 150 supplies a drive signal to one LED 240. By means of this configuration, each LED 240a is supplied with drive signal 151a having current value $I_a$, each LED 240b is supplied with drive signal 151b having current value $I_b$, each LED 240c is supplied with drive signal 151c having current value $I_c$, each LED 240d is supplied with drive signal 151d having current value $I_d$, each LED 240e is supplied with drive signal 151e having current value $I_e$, and each LED 240f is supplied with drive signal 151f having current value $I_f$.

Here, current value $I_a$ is smaller than current value $I_b$, current value $I_b$ is smaller than current value $I_c$, current value $I_c$ is smaller than current value $I_d$, current value $I_d$ is smaller than current value $I_e$, and current value $I_e$ is smaller than current value $I_f$. Drive signals 151*a*, 151*b*, 151*c*, 151*d*, 151*e*, and 151*f* all have the same duty cycle.

That is to say, among LEDs 240, those placed higher up and located nearer liquid crystal driver 111 are supplied with a lower current.

The current value of each LED 240 is set optimally based on the temperature distribution in surface area 221 of LED backlight 220. For example, in an area (for example, area 222*a*) shown as a high-temperature area in the temperature distribution for a reason such as being located comparatively high up, or being located comparatively near liquid crystal driver 111, an LED 240 current value is set comparatively low. And in an area (222*f*) shown as a low-temperature area in the temperature distribution for a reason such as being located comparatively low down, or being located comparatively far from liquid crystal driver 111, an LED 240 current value is set comparatively high. These settings are made in such away that the junction temperature becomes equal in all LEDs 240.

By this means, among LEDs 240, those placed higher up and located nearer liquid crystal driver 111 emit light at lower brightness. When this kind of drive control is performed, a difference in brightness may occur between individual LEDs 240. However, since the junction temperatures of all LEDs 240 are equal, no difference in aging degradation progress occurs between individual LEDs 240. Therefore, even if there is a difference in brightness between LEDs 240, such a balance of brightness is maintained unchanged over a long period.

Also, among LEDs 240, those placed higher up, located nearer liquid crystal driver 111, and supplied with a lower current, are placed with higher density adjacent to another LED 240 forming the same array. For example, the number and placement positions of LEDs 240 of predetermined areas (for example, areas 222*a*, 222*b*, 222*c*, 222*d*, 222*e*, and 122*f*) are set in such a way that luminous flux is equal for each of those predetermined areas.

By this means, uniformity of brightness is realized over the entire area of the display screen, and is maintained unchanged over a long period.

It is possible to obtain the same kind of effect by making current values I the same, making the duty cycle of drive signal 151*a* smaller than that of drive signal 151*b*, making the duty cycle of drive signal 151*b* smaller than that of drive signal 151*c*, making the duty cycle of drive signal 151*c* smaller than that of drive signal 151*d*, making the duty cycle of drive signal 151*d* smaller than that of drive signal 151*e*, and making the duty cycle of drive signal 151*e* smaller than that of drive signal 151*f*.

Next, the brightness correction method used in liquid crystal display apparatus 200 will be described.

Figure 9:
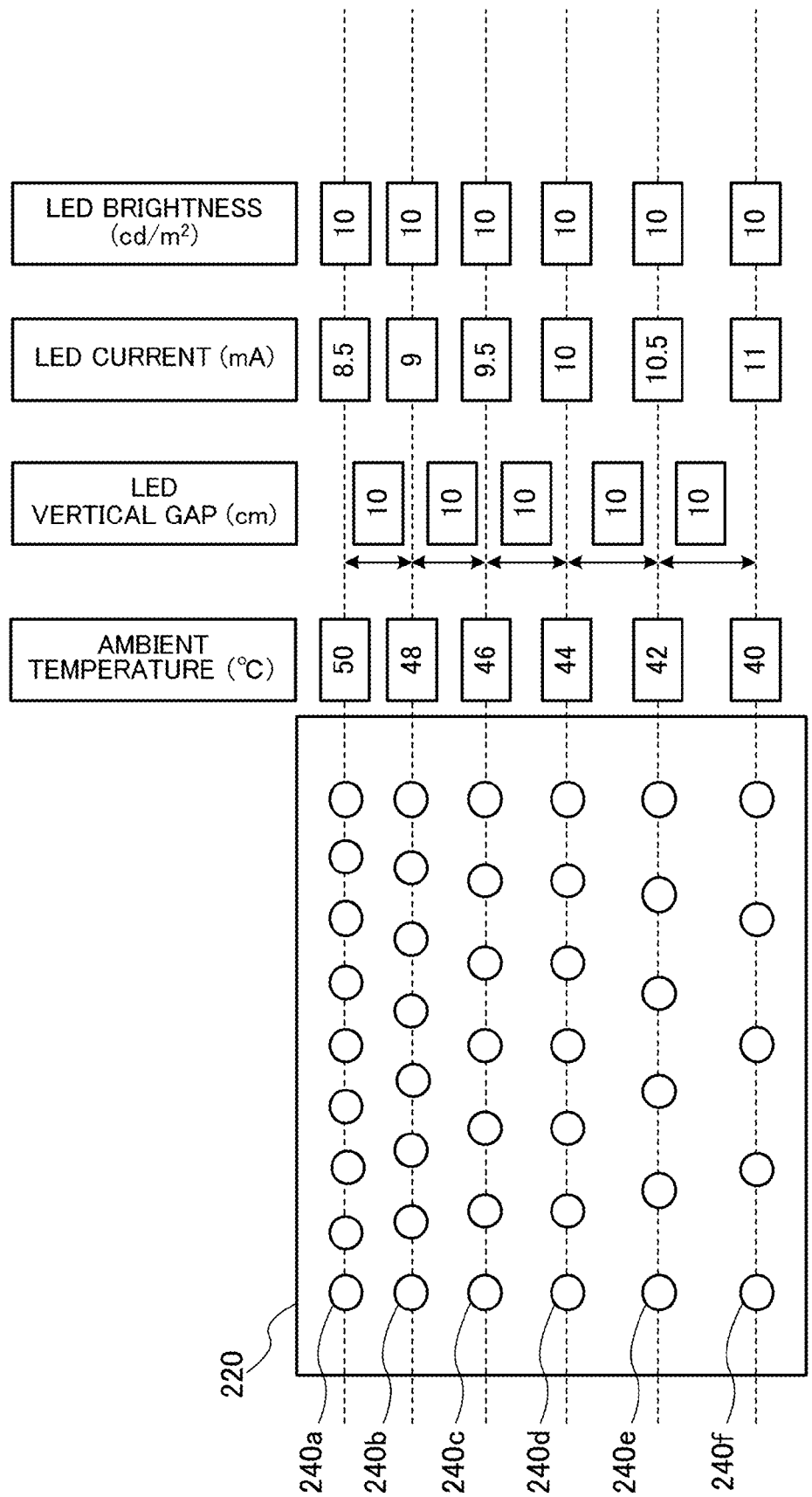
FIG. 9 is a drawing showing a brightness correction method according to Embodiment 2 of the present invention.

FIG. 9 is a drawing for explaining the brightness correction method used in liquid crystal display apparatus 200. Here, a case is described byway of example in which the ambient temperature of an area located higher up becomes higher during LED 240 illumination.

LEDs 240 are placed with higher density the higher their placement position. Simply by employing this kind of LED placement, a difference in a decrease in LED 240 brightness due to a difference in ambient temperature can be corrected, and brightness can be made uniform over the entire area of the display screen. This is possible even if drive signals with the same current value are supplied to all LEDs 240.

However, in this embodiment, LED placement is decided in such a way that supposing that drive signals with the same current value are supplied to all LEDs 240, brightness is higher in an area higher up in the display screen. Thus, when this kind of LED placement is employed, LEDs 240 are supplied with a lower current the higher their placement position. By this means, brightness in the LED 240*a* illumination area (that is, the area of the display screen illuminated by light emitted from all LEDs 240*a*), brightness in the LED 240*b* illumination area, brightness in the LED 240*c* illumination area, brightness in the LED 240*d* illumination area, brightness in the LED 240*e* illumination area, and brightness in the LED 240*f* illumination area, become uniform.

As described above, according to this embodiment, a lower current is supplied to LEDs 240 placed in an area with a higher ambient temperature within surface area 221 of substrate 230 of LED backlight 220. By this means, the progress of aging degradation of all LEDs 240 provided in LED backlight 220 is made uniform. Therefore, the balance of brightness over the entire area of the display screen can be maintained over a long period. Also, according to this embodiment, control to slow aging degradation (that is, supply of a relatively low current) is performed for those of LEDs 240 for which aging degradation should be relatively rapid due to a relatively high ambient temperature. Therefore, the life of LED backlight 220 can be prolonged.

Furthermore, according to this embodiment, since array gaps are uniform in the vertical direction and LED 240 gaps are nonuniform in the horizontal direction, it is possible to achieve an improvement in liquid crystal moving image performance by means of a backlight scan with the same kind of timing as heretofore.

In this embodiment, a case has been described by way of example in which the ambient temperature of an area higher up is higher, and a configuration has been described in which LEDs 240 placed in an area higher up are placed with higher density, and are driven by a lower current. However, other configurations are also possible.

For example, if liquid crystal driver 111 is placed in proximity to the lower edge of liquid crystal panel 110, so that the ambient temperature of a lower area becomes higher than that of an area above, a configuration can be employed in which LEDs 240 placed in a lower area are placed with higher density, and are driven by a lower current.

Also, if liquid crystal driver 111 is placed in proximity to the left-hand edge of liquid crystal panel 110, so that the ambient temperature of an area to the left becomes higher than that of an area to the right, a configuration can be employed in which LEDs 240 placed in an area to the left are placed with higher density, and are driven by a lower current.

Also, if liquid crystal driver 111 is placed in proximity to the right-hand edge of liquid crystal panel 110, so that the ambient temperature of an area to the right becomes higher than that of an area to the left, a configuration can be employed in which LEDs 240 placed in an area to the right are placed with higher density, and are driven by a lower current.

Essentially, when the ambient temperature of an area near liquid crystal driver 111 becomes higher than the ambient temperature of an area farther away, a configuration can be employed in which LEDs 240 placed in the former area are placed with higher density, and are driven by a lower current.

Exactly the same applies to a power supply section—that is, power supply circuitry supplying power to liquid crystal driver 111, LED drive circuits 150, and so forth—and to other heat-generating members, as to liquid crystal driver 111. This is because a power supply section and the like also generate heat. Thus, the placement and drive current values of LEDs 240 can be decided according to the placement positions of a power supply section and so forth.

Even if there is temperature distribution such that the ambient temperature of an area higher up does not become higher due to the internal structure of liquid crystal display apparatus 200, the placement and drive current values of LEDs 290 can still be decided based on that temperature distribution.

In this embodiment, LEDs 240 are white LEDs, but the same kind of effect as described above can also be realized if LEDs 290 are a combination of LEDs of three colors—R (red), G (green), and B (blue). In this case, a configuration is employed in which more red LEDs, which decrease greatly in brightness due to temperature, are placed in a high-temperature area than green or blue LEDs. By this means, the color temperature balance can also be maintained over a long period.

According to this embodiment, LEDs 290 are placed so as to form linear arrays, but the LED 240 placement scheme is not limited to this. Various kinds of placement schemes can be employed, such as placing LEDs 290 so as to form zigzag arrays, for example.

Embodiment 3

Figure 10:
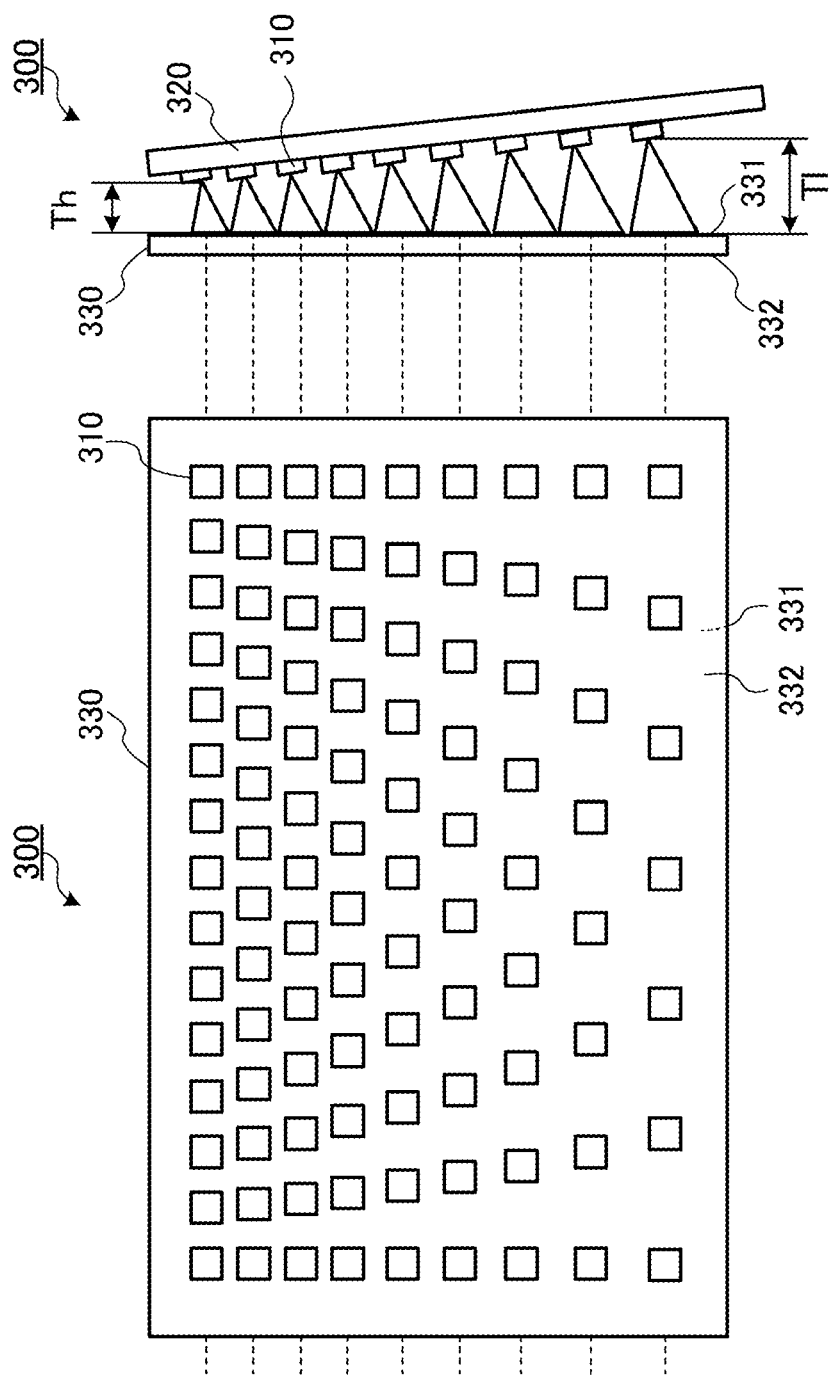
FIG. 10A is a schematic front view of an LED backlight according to Embodiment 3 of the present invention.
FIG. 10B is a schematic side view of an LED backlight according to Embodiment 3 of the present invention.

FIG. 10A and FIG. 10B are drawings showing the configuration of an LED backlight (backlight apparatus) according to Embodiment 3 of the present invention. FIG. 10A is a schematic front view of the LED backlight, and FIG. 10B is a schematic side view of the LED backlight. This embodiment relates, for example, to an LED backlight that is used as a liquid crystal display backlight and is configured so that brightness at the top of the screen is made particularly high when the liquid crystal display is set up so that the screen is vertical. A vertical direction in FIG. 10A and FIG. 10B corresponds to a vertical direction when the liquid crystal display apparatus in which the LED backlight is used is set up—that is, the vertical direction of the screen.

In FIG. 10A and FIG. 10B, LED backlight 300 has a plurality of LEDs 310, substrate 320 on which plurality of LEDs 310 are placed, and diffuser plate 330 placed on the light emitting side of LEDs 310, as main components. A plurality of LEDs 310 are white LEDs, for example. Substrate 320 is a flat printed circuit board using a material having insulating properties, such as glass epoxy resin. Diffuser plate 330 is a flat acrylic sheet, having inputting surface 331 upon which light emitted from plurality of LEDs 310 is input, and outputting surface 332 placed opposite inputting surface 331. Diffuser plate 330 diffuses light input upon inputting surface 331 by means of surface diffusion, internal diffusion, or a combination thereof, and outputs light from outputting surface 332.

LEDs 310 are placed with progressively higher density toward the top of diffuser plate 330 in the drawings. Specifically, LEDs 310 are installed on substrate 320 with a placement density inversely proportional to their distance from the top of diffuser plate 330.

Substrate 320 is placed at an inclined angle with respect to diffuser plate 330 so that the distance from diffuser plate 330 increases in the downward direction in the drawings. By this means, the distance from LEDs 310 to inputting surface 331 of diffuser plate 330 (hereinafter referred to as the "light source distance") increases progressively in the downward direction in the drawings.

Here, it is assumed that the light source distance is set so that a value obtained by multiplying the placement density by the square of the light source distance is constant. This is based on the fact that, if the shortest light source distance at which brightness nonuniformity attains a permissible level with LEDs 310 arranged in a square array with a pitch of d is designated T, pitch d and shortest light source distance T have a proportional relationship. If the ratio between pitch d and shortest light source distance T is designated α, LED backlight 300 satisfies Equation (1) below.

$$T/d = \alpha \quad (1)$$

In this case, placement density $D = 1/d^2$. Therefore, if the relationship between density D and shortest light source distance T is expressed as $\alpha^2 = k$, Equation (2) below is satisfied.

$$D \times T^2 = k \quad (2)$$

With LED backlight 300 of this embodiment, as the placement density changes in the downward direction, inclined placement is implemented, and the light source distance changes so as to become a light source distance for which nonuniformity of brightness is at a permissible level in each area range. If the light source distance and placement density of LEDs 310 located at the top are designated Th and Dh respectively, and the light source distance and placement density of LEDs 310 located at the bottom are designated Tl and Dl respectively, LED backlight 300 satisfies Equation (3) below.

$$k = Dh \times Th^2 = Dl \times Tl^2 \quad (3)$$

An example of numeric values that satisfy Equation (3) is shown below. Placement densities Dh and Dl are based on square areas with 50 mm sides on substrate 320, and distances Th and Tl are distances from the centers of the square areas to inputting surface 331 of diffuser plate 330.

$k = 0.64$ $Dh = 0.0064$ [units/mm^2]

$Dl = 0.0016$ [units/mm^2]

$Th = 10$ [mm]

$Tl = 20$ [mm]

By configuring LED backlight 300 so as to satisfy above Equation (3), nonuniformity of brightness of outputting surface 332 is reduced as compared with a configuration in which the light source distance is constant, and as compared with a configuration in which the light source distance becomes progressively shorter in the downward direction in the drawings.

As described above, according to this embodiment, the lower the placement density of a position, the greater is the distance from LEDs 310 to diffuser plate 330, and the wider is the diffusion of light that is emitted from a light source and is input upon diffuser plate 330. By this means, an irradiated area in inputting surface 331 of diffuser plate 330 increases, enabling nonuniformity of brightness in outputting surface 332 of diffuser plate 330 to be reduced.

Also, since the placement density of LEDs 310 is inversely proportional to the distance from the top of diffuser plate 330, the above-described reduction in nonuniformity of brightness can be realized by simple settings—namely, settings of the light source distance of LEDs 310 located at the top and the light source distance of LEDs 310 located at the bottom.

Furthermore, since nonuniformity of brightness can be reduced when the placement density of LEDs 310 is high at the top of diffuser plate 330, nonuniformity of brightness can be reduced when high brightness is secured at the top of diffuser plate 330. That is to say, LED backlight 300 can be provided that achieves both a reduction in nonuniformity of brightness of outputting surface 332 and an improvement in the brightness of the upper part of outputting surface 332.

Moreover, since the external shape of LED backlight 300 can be made a wedge shape that is thin at the top, a liquid crystal display apparatus using LED backlight 300 is advantageous in terms of design characteristics and set-up stability.

In this embodiment, the high/low placement density variation trend of LEDs 310 is not limited to what has been described above. For example, in a case in which high brightness is secured at the bottom of diffuser plate 330, nonuniformity of brightness can be similarly reduced by inclining substrate 320 so that the light source distance increases the lower the placement density of a position.

Embodiment 4

As Embodiment 4 of the present invention, a case will be described in which LED placement density is inversely proportional to the distance from a vertically central part of a diffuser plate.

Figure 11:
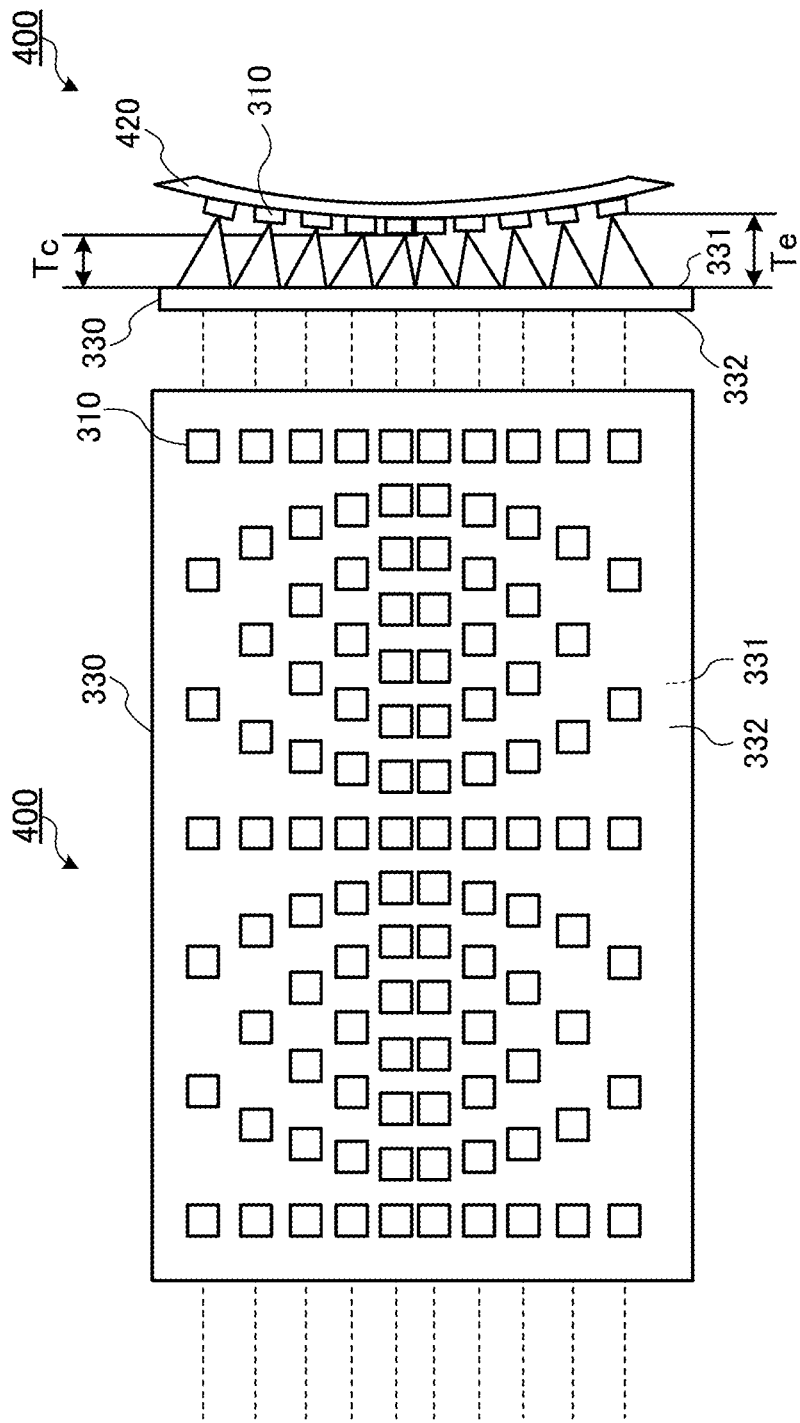
FIG. 11A is a schematic front view of an LED backlight according to Embodiment 4 of the present invention.
FIG. 11B is a schematic side view of an LED backlight according to Embodiment 4 of the present invention.

FIG. 11A and FIG. 11B are drawings showing the configuration of an LED backlight according to Embodiment 4 of the present invention, and correspond to FIG. 10A and FIG. 10B of Embodiment 3. Components identical to those in FIG. 10A and FIG. 10B are assigned the same reference codes as in FIG. 10A and FIG. 10B, and descriptions thereof are omitted here. FIG. 11A is a schematic front view of the LED backlight, and FIG. 11B is a schematic side view of the LED backlight.

As shown in FIG. 11A and FIG. 11B, LEDs 310 are placed in LED backlight 400 with progressively higher density the nearer they are to the vertically central part of diffuser plate 330 in the drawings. Specifically, LEDs 310 are installed on substrate 420 described later herein with a placement density inversely proportional to their distance from the vertical-direction center of diffuser plate 330.

Substrate 420 is of cylindrical shape having a convex surface on the diffuser plate 330 side, so that the distance from diffuser plate 330 increases progressively the farther away from the vertically central part in the drawings. As a result of this shape of substrate 420, the area of the irradiation range of individual LEDs 310 increases the greater the distance from the vertically central part of diffuser plate 330—that is, the lower the LED 310 placement density of a position.

Here, as in Embodiment 3, it is assumed that the light source distance is set so that a value obtained by multiplying the light source distance by the square of the placement density is constant. That is to say, if the light source distance and placement density of LEDs 310 located in the vertically central part of diffuser plate 330 are designated Tc and Dc respectively, and the light source distance and placement density of LEDs 310 located at the top and LEDs 310 located at the bottom are designated Te and De respectively, LED backlight 400 satisfies Equation (4) below.

$$k = Dc \times Tc^2 = De \times Te^2 \quad (4)$$

An example of numeric values that satisfy Equation (4) is shown below.

$k=0.64$ $Dc=0.0064$ [units/mm^2]

$De=0.0025$ [units/mm^2]

$Tc=10$ [mm]

$Te=16$ [mm]

Thus, according to this embodiment, since the light source distance varies according to the placement density, LED backlight 400 can be provided that achieves both an improvement in brightness and a reduction in nonuniformity of brightness of the vertically central part of outputting surface 332.

In this embodiment, the high/low placement density variation trend of LEDs 310 is not limited to what has been described above. For example, in a case in which high brightness is secured in the horizontal central part of diffuser plate 330, nonuniformity of brightness can be similarly reduced by setting the shape of the substrate so that the light source distance increases the lower the placement density of a position.

Embodiment 5

As Embodiment 5 of the present invention, a case will be described in which LED placement density is proportional to the distance from a vertically central part of a diffuser plate.

Figure 12:
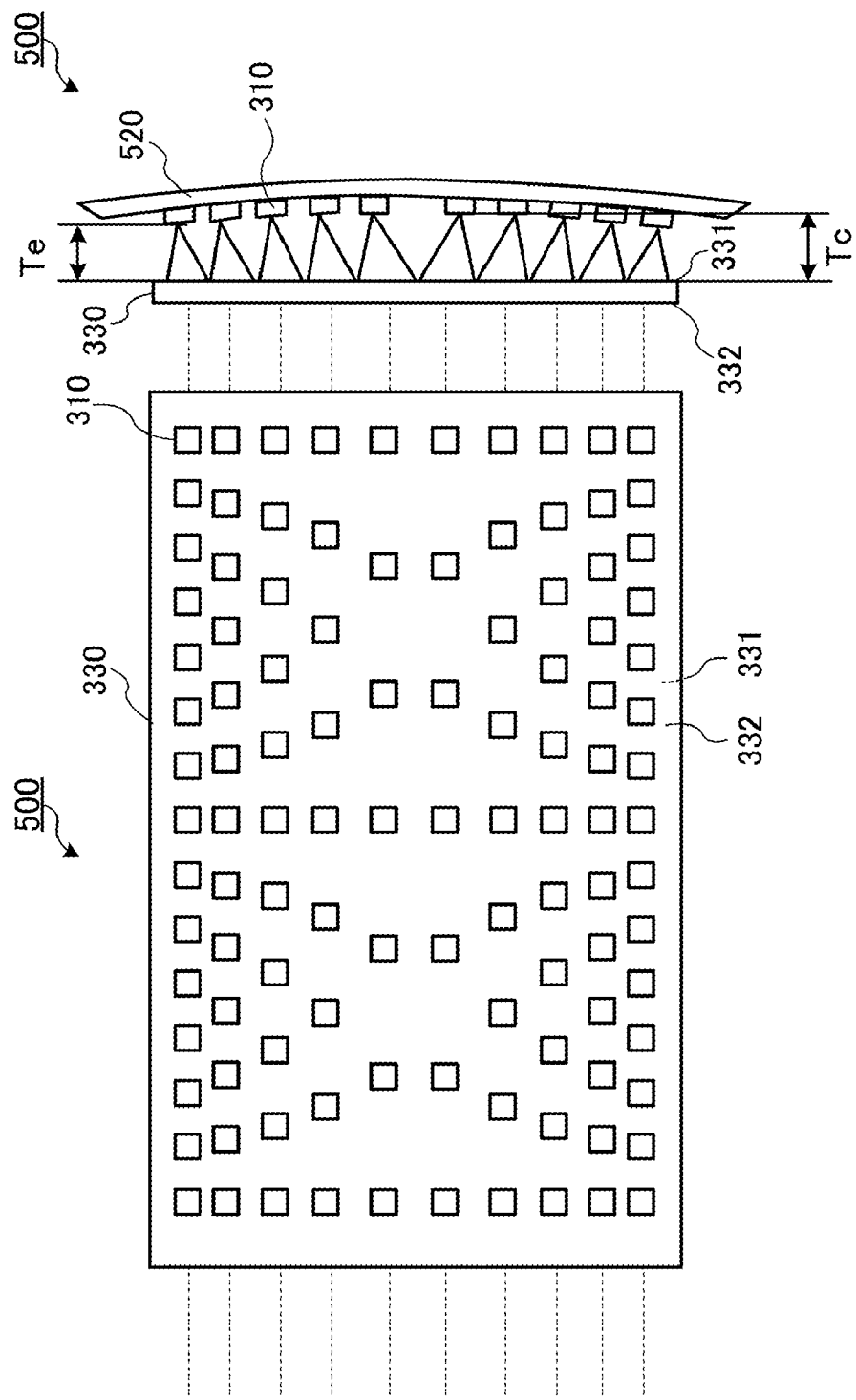
FIG. 12A is a schematic front view of an LED backlight according to Embodiment 5 of the present invention.
FIG. 12B is a schematic side view of an LED backlight according to Embodiment 5 of the present invention.

FIG. 12A and FIG. 12B are drawings showing the configuration of an LED backlight according to Embodiment 5 of the present invention, and correspond to FIG. 10A and FIG. 10B of Embodiment 3 and to FIG. 11A and FIG. 11B of Embodiment 4. Components identical to those in FIG. 10A, FIG. 10B, FIG. 11A, and FIG. 11B are assigned the same reference codes as in FIG. 10A, FIG. 10B, FIG. 11A, and FIG. 11B, and descriptions thereof are omitted here. FIG. 12A is a schematic front view of the LED backlight, and FIG. 12B is a schematic side view of the LED backlight.

As shown in FIG. 12A and FIG. 12B, LEDs 310 are placed in LED backlight 500 with progressively higher density the farther they are from the vertically central part of diffuser plate 330 in the drawings. Specifically, LEDs 310 are installed on substrate 520 described later herein with a placement density proportional to their distance from the vertical-direction center of diffuser plate 330.

Substrate 520 is of cylindrical shape having a concave surface on the diffuser plate 330 side, so that the distance from diffuser plate 330 increases progressively the nearer the vertically central part in the drawings. As a result of this shape of substrate 520, the area of the irradiation range of individual LEDs 310 increases the shorter the distance from the vertically central part of diffuser plate 330—that is, the lower the LED 310 placement density of a position.

Here, it is assumed that the light source distance is set so that a value obtained by multiplying the light source distance by the square of the placement density is constant. That is to say, if the light source distance and placement density of LEDs 310 located in the vertically central part of diffuser plate 330 are designated Tc and Dc respectively, and the light source distance and placement density of LEDs 310 located at the top and LEDs 310 located at the bottom are designated Te and De respectively, LED backlight 500 satisfies Equation (5) below.

$$k = Dc \times Tc^2 = De \times Te^2 \quad (5)$$

An example of numeric values that satisfy Equation (5) is shown below.

$k=0.64$ $Dc=0.0025$ [units/mm^2]

$De=0.0064$ [units/mm^2]

$Tc=16$ [mm]

$Te=10$ [mm]

Thus, according to this embodiment, nonuniformity of brightness can be reduced when LED 310 placement density is high in a peripheral part in the vertical direction of diffuser plate 330, and therefore nonuniformity of brightness can be reduced when high brightness is secured in a peripheral part in the vertical direction of diffuser plate 330. That is to say, LED backlight 500 can be provided that achieves both a reduction in nonuniformity of brightness of outputting surface 332 and an improvement in the brightness of a peripheral part in the vertical direction of outputting surface 332.

In this embodiment, the high/low placement density variation trend of LEDs 310 is not limited to what has been described above. For example, in a case in which high brightness is secured in a peripheral part in the horizontal direction of diffuser plate 330, nonuniformity of brightness can be similarly reduced by setting the shape of the substrate so that the light source distance increases the lower the placement density of a position.

Embodiment 6

As Embodiment 6 of the present invention, an LED backlight will be described that provides for control of the amount of luminescence of LEDs.

Figure 13:
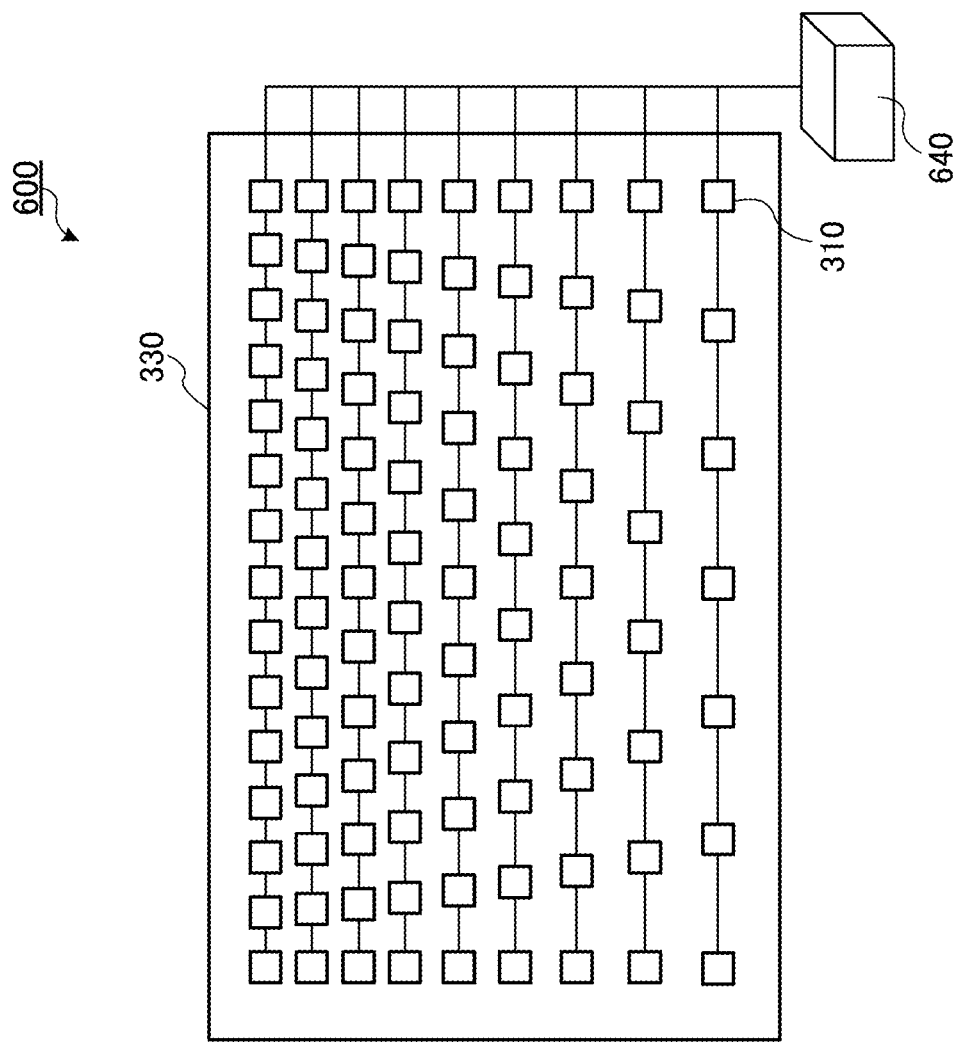
FIG. 13 is a drawing showing the configuration of an LED backlight according to Embodiment 6 of the present invention.

FIG. 13 is a schematic configuration diagram drawing showing the configuration of an LED backlight according to Embodiment 6 of the present invention.

In FIG. 13, LED backlight 600 has a plurality of LEDs 310 placed with uniform placement density in the horizontal direction and with nonuniform placement density in the vertical direction. That is to say, the LED 310 placement density distribution is of the same kind as in Embodiment 3. Also, LED backlight 600 has LED drive section 640 that controls the amount of luminescence of plurality of LEDs 310.

Taking a plurality of LEDs 310 aligned in the horizontal direction as one block, LED drive section 640 controls the amount of luminescence of each LED 310 on a block-by-block basis according to an input control signal.

By means of this kind of configuration, control of the amount of luminescence of LEDs 310 can be performed in a manner appropriate to the LED 310 placement density distribution, and a desired brightness distribution can be obtained efficiently.

Embodiment 7

As Embodiment 7 of the present invention, a liquid crystal display apparatus will be described that uses an LED backlight according to Embodiment 6.

Figure 14:
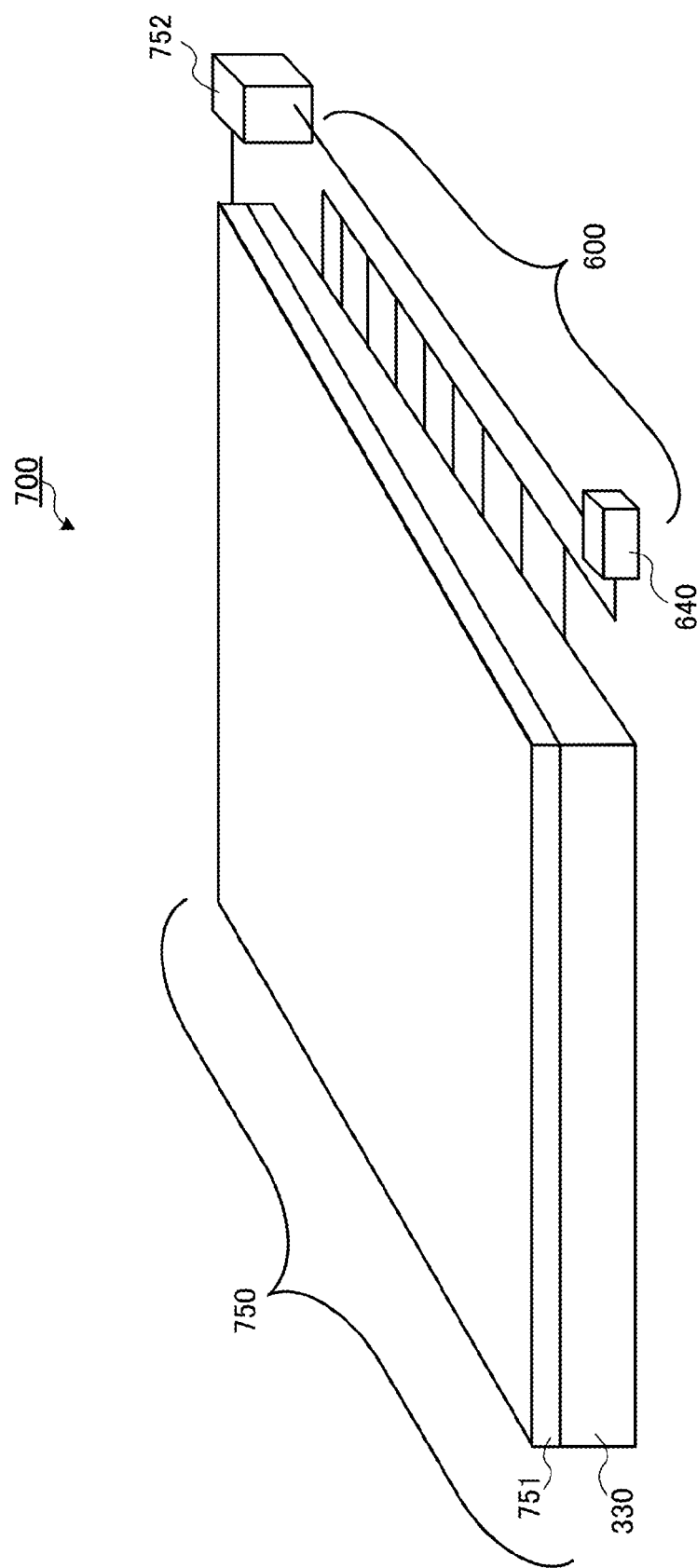
FIG. 14 is a drawing showing the configuration of a liquid crystal display apparatus according to Embodiment 7 of the present invention.

FIG. 14 is a schematic configuration diagram showing the configuration of a liquid crystal display apparatus according to Embodiment 7 of the present invention.

In FIG. 14, liquid crystal display apparatus 700 has LED backlight 600 according to Embodiment 6 and liquid crystal unit 750. Components identical to those in FIG. 13 are assigned the same reference codes as in FIG. 13, and descriptions thereof are omitted here.

Liquid crystal unit 750 is illuminated by LED backlight 600, and controls the arrival on the observer's side of light emitted from LED backlight 600. Liquid crystal unit 750 has liquid crystal panel 751 and liquid crystal driver 752.

Liquid crystal panel 751 is a transmissive or semi-transmissive liquid crystal panel. Liquid crystal panel 751 transmits light emitted from LED backlight 600, and emits this transmitted light from the front surface of the display screen.

Liquid crystal driver 752 controls a drive voltage that drives liquid crystal panel 751 based on a video signal that is a digital signal indicating video to be displayed on the display screen of liquid crystal panel 751, and thereby controls the transmittance of liquid crystal panel 751. As a result of this control, liquid crystal panel 751 displays video.

LED backlight 600 controls the amount of luminescence of LEDs 310 on a block-by-block basis as described in Embodiment 6. On the other hand, light transmittance cannot be made zero for liquid crystal panel 751. Therefore, by minimizing the amount of luminescence of LEDs 310 on a block-by-block basis, black brightness—the brightness of a black display part of the screen—can be reduced, and an improvement in screen contrast can be achieved.

Thus, according to this embodiment, video having a desired brightness distribution without nonuniformity of brightness can be displayed with a high degree of contrast, and power consumption can be reduced. Also, when LED backlight 600 having a wedge shape that is thin at the top is employed as described above, the external shape of liquid crystal display apparatus 700 can also be made the same kind of wedge shape, which is advantageous in terms of design characteristics and set-up stability.

In the above-described embodiments, cases have been described in which a light source is an LED, but the present invention is not limited to this. For example, the present invention can also be applied to cases in which light sources are of various kinds, such as a semiconductor laser, gas laser, solid-state laser, fiber laser, lamp, and so forth, and various kinds of line light sources of a cathode ray tube or the like are placed with nonuniform distribution.

Embodiment 8

As Embodiment 8 of the present invention, a liquid crystal display apparatus that is distinctive in regard to liquid crystal driver placement and operation of the LED drive section will be described.

Figure 15:
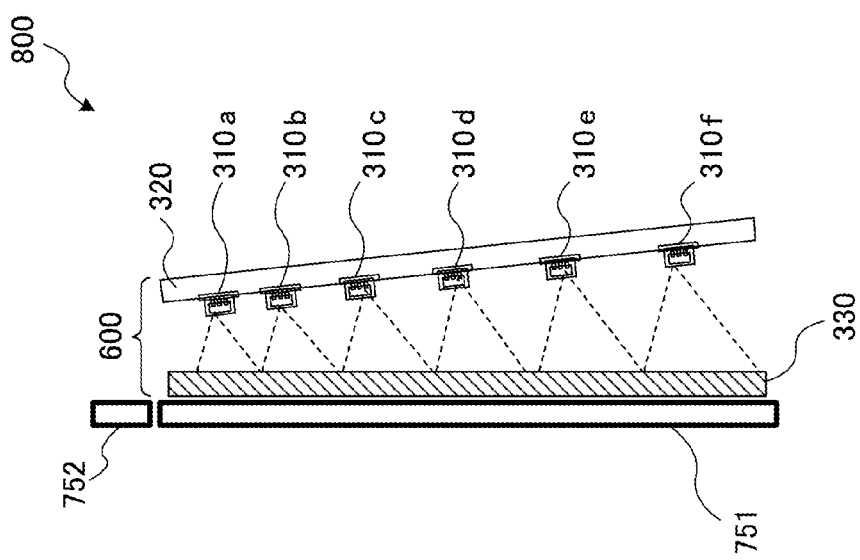
FIG. 15 is a side view of the principal parts of a liquid crystal display apparatus according to Embodiment 8 of the present invention.

FIG. 15 is a side view of the principal parts of a liquid crystal display apparatus according to Embodiment 8 of the present invention, and corresponds to FIG. 10B of Embodiment 3 and FIG. 14 of Embodiment 7. Components identical to those in FIG. 10B and FIG. 14 are assigned the same reference codes as in FIG. 10B and FIG. 14, and descriptions thereof are omitted here.

Liquid crystal display apparatus 800 has liquid crystal panel 751, liquid crystal driver 752, and LED backlight 600 as main components.

In this embodiment, liquid crystal driver 752 is placed in proximity to the upper edge of liquid crystal panel 751.

Liquid crystal driver 752 may also be placed in a location other than the above. For example, liquid crystal driver 752 may be placed in proximity to the lower edge, left-hand edge, or right-hand edge of liquid crystal panel 751, or may be placed elsewhere.

In LED backlight 600, substrate 320 is placed at an inclined angle to diffuser plate 330 placed on the rear surface side of liquid crystal panel 751, in the same way as in Embodiment 3. The surface of substrate 320 is an opposed section opposite the rear surface of liquid crystal panel 751, and LEDs 310a, 310b, 310c, 310d, 310e, and 310f are arrayed on this surface in approximately flat form facing the rear surface of diffuser plate 330. Diffuser plate 330 has a diffusing action on the input light, and outputs light from the outputting surface toward the rear surface of liquid crystal panel 751. That is to say, LED backlight 600 is a subjacent type of backlight apparatus.

Generally, a subjacent type of backlight apparatus has a sealed structure that can prevent the infiltration of dust or dirt, but LED backlight 600 may or may not employ a sealed structure.

LED backlight 600 illuminates liquid crystal panel 751 with light emitted from LEDs 310a, 310b, 310c, 310d, 310e, and 310f. In the following description, LEDs 310a, 310b, 310c, 310d, 310e, and 310f are referred to simply as "LED(s) 310" when described without any particular differentiation.

LED backlight 600 also has an LED drive section that drives LEDs 310, described later herein.

Here, LEDs 310 are white LEDs that emit white light when driven by a drive signal applied from an LED drive section described later herein. For example, when LEDs 310 are LED apparatuses having mainly a monochromatic (for example, blue) LED and a fluorescent material, LEDs 310 are configured so that light emitted from a monochromatic LED when a drive signal is applied is transmitted through the fluorescent material and becomes white light through the action of the fluorescent material.

LEDs 310 may also employ another configuration, such as a combination of LEDs of three colors—R (red), G (green), and B (blue).

Figure 16:
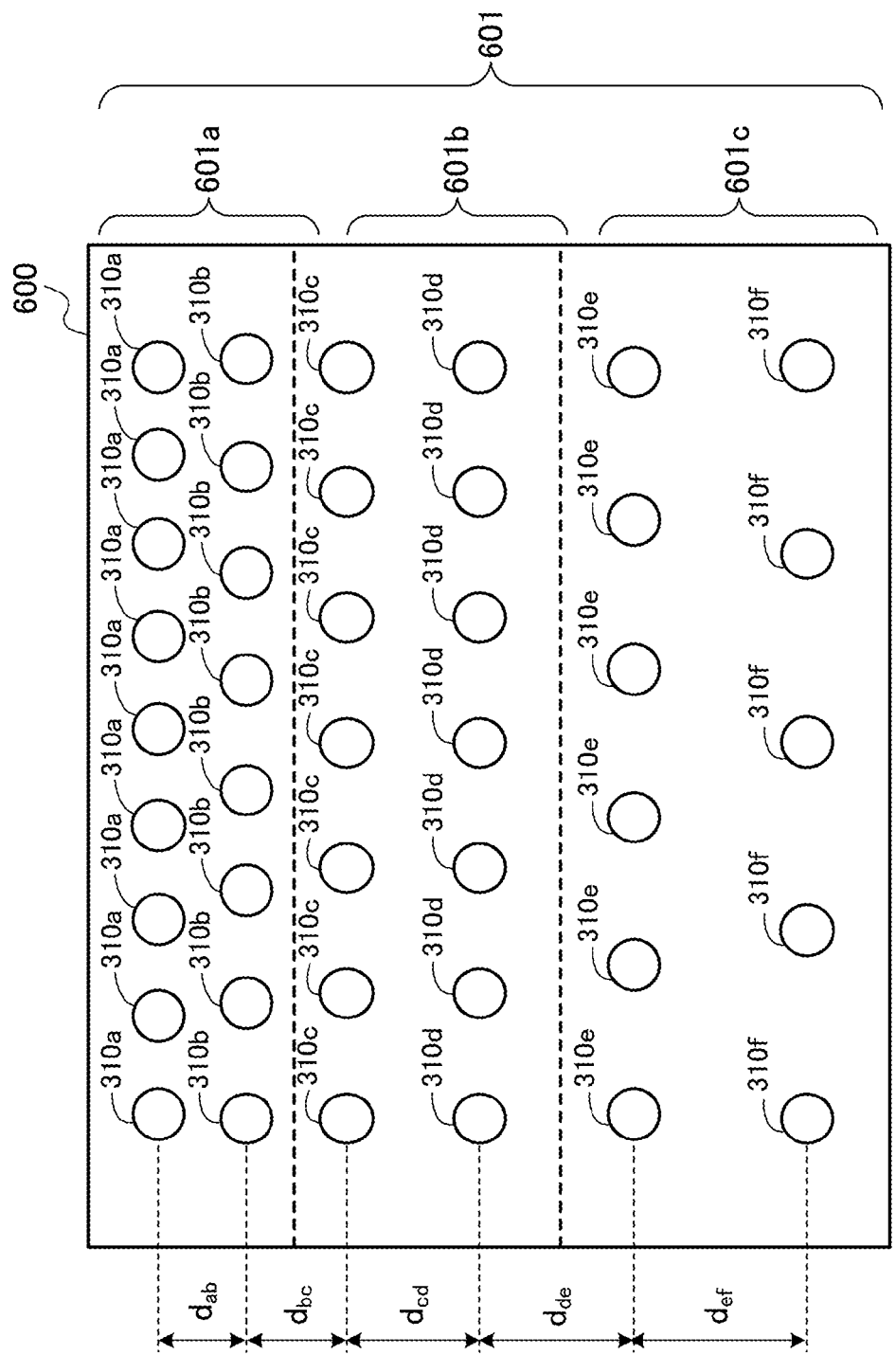
FIG. 16 is a drawing showing an LED array of an LED backlight according to Embodiment 8 of the present invention.

FIG. 16 is a drawing showing the placement of LEDs 310 in LED backlight 600.

LEDs 310 placed in area 601a located at the top are placed most densely, LEDs 310 placed in area 601c located at the bottom are placed least densely, and LEDs 310 placed in area 601b located in the middle are placed with medium density. To be more specific, in the vertical direction, pitch $d_{ab}$ between LED 310a and LED 310b is smaller than pitch $d_{bc}$ between LED 310b and LED 310c, pitch $d_{bc}$ is smaller than pitch $d_{cd}$ between LED 310c and LED 310d, pitch $d_{cd}$ is smaller than pitch $d_{de}$ between LED 310d and LED 3100e, and pitch $d_{de}$ is smaller than pitch $d_{ef}$ between LED 310d and LED 310f. Also, in the horizontal direction, the pitch of LEDs 310a is smaller than the pitch of LEDs 310b, the pitch of LEDs 310b is smaller than the pitch of LEDs 310c, the pitch of LEDs 310c is smaller than the pitch of LEDs 310d, the pitch of LEDs 310d is smaller than the pitch of LEDs 310e, and the pitch of LEDs 310e is smaller than the pitch of LEDs 310f.

Substrate 320 is placed at an inclined angle with respect to diffuser plate 330 so that the distance from diffuser plate 330 increases in the downward direction in the drawing. By this means, the distance from LEDs 310 to the inputting surface of diffuser plate 330 (the light source distance) increases progressively in the downward direction in the drawing.

Figure 17B:
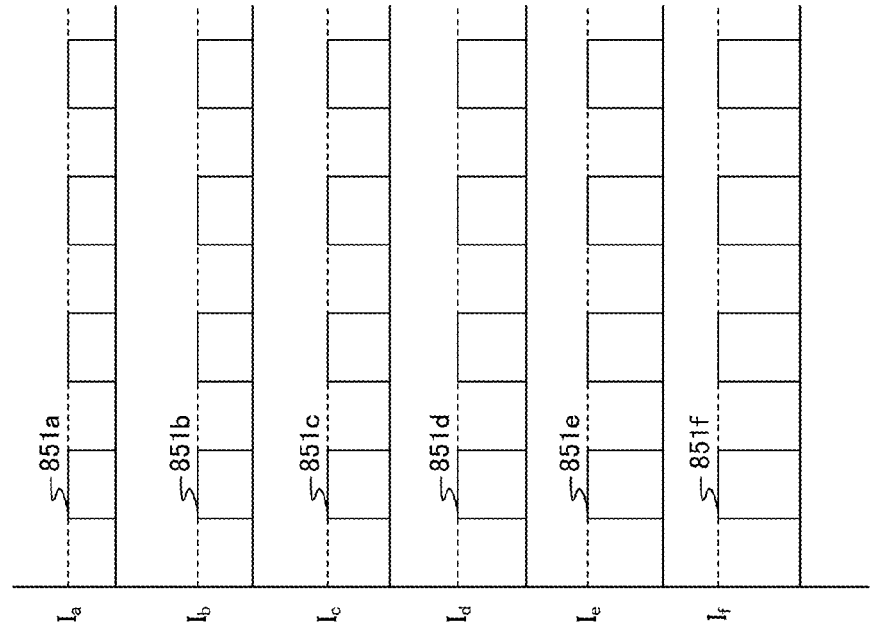
FIG. 17B is a waveform diagram showing drive signals according to Embodiment 8 of the present invention.
Figure 17A:
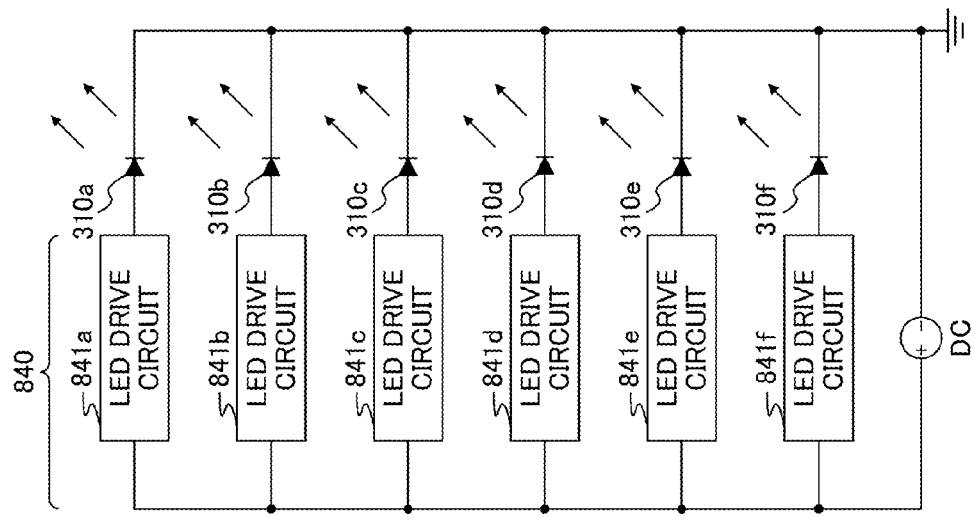
FIG. 17A is a circuit diagram showing the configuration of an LED drive section according to Embodiment 8 of the present invention.

FIG. 17A and FIG. 17B are drawings for explaining an LED drive section in LED backlight 600. FIG. 17A is a circuit diagram showing an example of the configuration of the LED drive section, and FIG. 17B is a waveform diagram showing an example of drive signals generated by the LED drive section and supplied to LEDs 310.

LED drive section 840 has LED drive circuits 841a, 841b, 841c, 841d, 841e, and 841f. In the following description, LED drive circuits 841a, 841b, 841c, 841d, 841e, and 841f are referred to simply as "LED drive circuit(s) 841" when described without any particular differentiation.

LED drive circuit 841a supplies drive signal 851a having preset current value $I_a$ to one LED 310a as a current supplying section. LED drive circuit 841b supplies drive signal 851b having current value $I_b$ to one LED 310b as a current supplying section. LED drive circuit 841c supplies drive signal 851c having current value $I_c$ to one LED 310c as a current supplying section. LED drive circuit 841d supplies drive signal 851d having current value $I_d$ to one LED 310d as a current supplying section. LED drive circuit 841e supplies drive signal 851e having current value $I_e$ to one LED 310e as a current supplying section. LED drive circuit 841f supplies drive signal 851f having current value $I_f$ to one LED 310f as a current supplying section.

Although not shown in FIG. 17A, LED drive section 840 has the same number of LED drive circuits 841 (as current supplying sections) as LEDs 310. Each LED drive circuit 841 supplies a drive signal to one LED 310. By means of this configuration, each LED 310a is supplied with drive signal 851a having current value $I_a$, each LED 310b is supplied with drive signal 851b having current value $I_b$, each LED 310c is supplied with drive signal 851c having current value $I_c$, each LED 310d is supplied with drive signal 851d having current value $I_d$, each LED 310e is supplied with drive signal 851e having current value $I_e$, and each LED 310f is supplied with drive signal 851f having current value $I_f$.

Here, current value $I_a$ is smaller than current value $I_b$, current value $I_b$ is smaller than current value $I_c$, current value $I_c$ is smaller than current value $I_d$, current value $I_d$ is smaller than current value $I_e$, and current value $I_e$ is smaller than current value $I_f$. Drive signals 851a, 851b, 851c, 851d, 851e, and 851f all have the same duty cycle.

That is to say, among LEDs 310, those placed higher up and located nearer liquid crystal driver 752 are supplied with a lower current.

The current value of each LED 310 is set optimally based on the temperature distribution in surface area 601 of LED backlight 600. For example, in an area (for example, area 601a) shown as a high-temperature area in the temperature distribution for a reason such as being located comparatively high up, or being located comparatively near liquid crystal driver 752, an LED 310 current value is set comparatively low. And in an area (601c) shown as a low-temperature area in the temperature distribution for a reason such as being located comparatively low down, or being located comparatively far from liquid crystal driver 752, an LED 310 current value is set comparatively high. These settings are made in such a way that the junction temperature becomes equal in all LEDs 310.

By this means, among LEDs 310, those placed higher up and located nearer liquid crystal driver 752 emit light at lower brightness. When this kind of drive control is performed, a difference in brightness may occur between individual LEDs 310. However, since the junction temperatures of all LEDs 310 are equal, no difference in aging degradation progress occurs between individual LEDs 310. Therefore, even if there is a difference in brightness between LEDs 310, such a balance of brightness is maintained unchanged over a long period.

Also, among LEDs 310, those placed higher up, located nearer liquid crystal driver 752, and supplied with a lower current, are placed with higher density adjacent to another LED 310.

Also, with LED backlight 600, the lower the placement density of a position, the greater is the distance from LEDs 310 to diffuser plate 330, and the wider is the diffusion of light that is emitted from a light source and is input upon diffuser plate 330. By this means, an irradiated area in the inputting surface of diffuser plate 330 increases, enabling nonuniformity of brightness in the outputting surface of diffuser plate 330 to be reduced.

By this means, uniformity of brightness is realized over the entire area of the display screen, and is maintained unchanged over a long period.

It is possible to obtain the same kind of effect by making current values I the same, making the duty cycle of drive signal 851a smaller than that of drive signal 851b, making the duty cycle of drive signal 851b smaller than that of drive signal 851c, making the duty cycle of drive signal 851c smaller than that of drive signal 851*d*, making the duty cycle of drive signal 851*d* smaller than that of drive signal 851*e*, and making the duty cycle of drive signal 851*e* smaller than that of drive signal 851*f*.

Next, the brightness correction method used in liquid crystal display apparatus 800 will be described.

Figure 18:
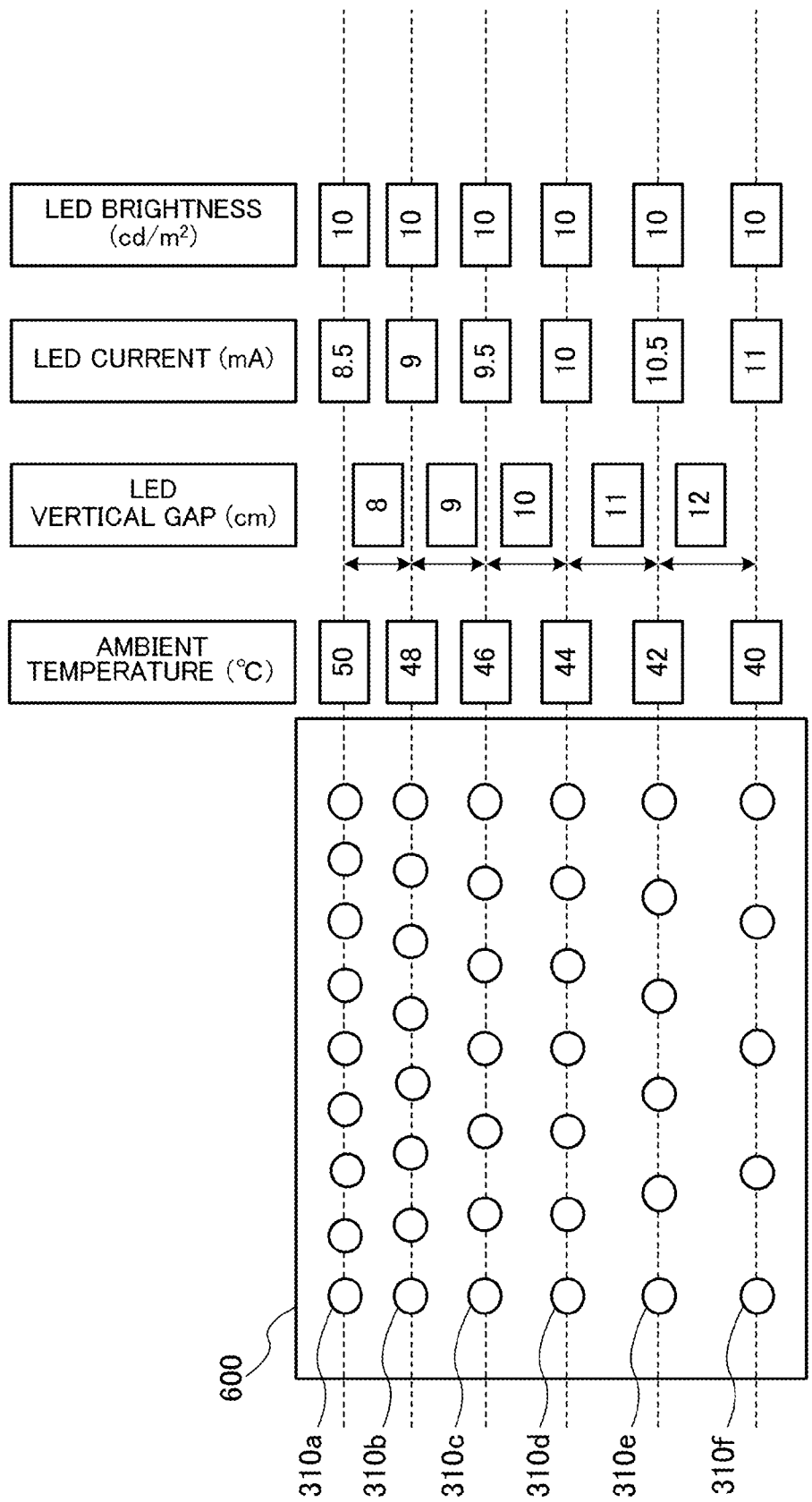
FIG. 18 is a drawing showing a brightness correction method according to Embodiment 8 of the present invention.

FIG. 18 is a drawing for explaining the brightness correction method used in liquid crystal display apparatus 800. Here, a case is described by way of example in which the ambient temperature of an area located higher up becomes higher during LED 310 illumination.

LEDs 310 are placed with higher density the higher their placement position. Simply by employing this kind of LED placement, a difference in a decrease in LED 310 brightness due to a difference in ambient temperature can be corrected, and brightness can be made uniform over the entire area of the display screen. This is possible even if drive signals with the same current value are supplied to all LEDs 310.

However, in this embodiment, LED placement is decided in such a way that supposing that drive signals with the same current value are supplied to all LEDs 310, brightness is higher in an area higher up in the display screen. Thus, when this kind of LED placement is employed, LEDs 310 are supplied with a lower current the higher their placement position. By this means, brightness in the LED 310*a* illumination area (that is, the area of the display screen illuminated by light emitted from all LEDs 310*a*), brightness in the LED 310*b* illumination area, brightness in the LED 310*c* illumination area, brightness in the LED 310*d* illumination area, brightness in the LED 310*e* illumination area, and brightness in the LED 310*f* illumination area, become uniform.

According to the brightness correction method shown in FIG. 18, the same kind of effect can be realized as described in detail with reference to FIG. 5A and FIG. 5B in Embodiment 1.

Therefore, according to this embodiment, a lower current is supplied to LEDs 310 placed in an area with a higher ambient temperature within surface area 601 of substrate 320 of LED backlight 600. By this means, the progress of aging degradation of all LEDs 310 provided in LED backlight 600 is made uniform. Therefore, the balance of brightness over the entire area of the display screen can be maintained over a long period. Also, according to this embodiment, control to slow aging degradation (that is, supply of a relatively low current) is performed for those of LEDs 310 for which aging degradation should be relatively rapid due to a relatively high ambient temperature. Therefore, the life of LED backlight 600 can be prolonged.

Also, according to this embodiment, the lower the placement density of a position, the greater is the distance between LEDs 310 and diffuser plate 330. By this means, nonuniformity of brightness in the outputting surface of diffuser plate 330 can be reduced even if a configuration is employed that prolongs the life of LED backlight 600 by varying the placement density, as described above.

In this embodiment, a case has been described by way of example in which the ambient temperature of an area higher up is higher, and a configuration has been described in which LEDs 310 placed in an area higher up are placed with higher density, and are driven by a lower current. However, other configurations are also possible.

For example, if liquid crystal driver 752 is placed in proximity to the lower edge of liquid crystal panel 751, so that the ambient temperature of a lower area becomes higher than that of an area above, a configuration can be employed in which LEDs 310 placed in a lower area are placed with higher density, and are driven by a lower current. With this configuration, provision should be made for the distance between LEDs 310 and diffuser plate 330 to be greater the higher up an area is.

Also, if liquid crystal driver 752 is placed in proximity to the left-hand edge of liquid crystal panel 751, so that the ambient temperature of an area to the left becomes higher than that of an area to the right, a configuration can be employed in which LEDs 310 placed in an area to the left are placed with higher density, and are driven by a lower current. With this configuration, provision should be made for the distance between LEDs 310 and diffuser plate 330 to be greater the farther to the right an area is.

Also, if liquid crystal driver 752 is placed in proximity to the right-hand edge of liquid crystal panel 751, so that the ambient temperature of an area to the right becomes higher than that of an area to the left, a configuration can be employed in which LEDs 310 placed in an area to the right are placed with higher density, and are driven by a lower current. With this configuration, provision should be made for the distance between LEDs 310 and diffuser plate 330 to be greater the farther to the left an area is.

Essentially, when the ambient temperature of an area near liquid crystal driver 752 becomes higher than the ambient temperature of an area farther away, a configuration can be employed in which LEDs 310 placed in the former area are placed with higher density, and are driven by a lower current.

Exactly the same applies to a power supply section—that is, power supply circuitry supplying power to liquid crystal driver 752, LED drive circuits 841, and so forth—and to other heat-generating members, as to liquid crystal driver 752. This is because a power supply section and the like also generate heat. Thus, the placement, drive current values, and light source distances of LEDs 310 can be decided according to the placement positions of a power supply section and so forth.

Even if there is temperature distribution such that the ambient temperature of an area higher up does not become higher due to the internal structure of liquid crystal display apparatus 800, the placement, drive current values, and light source distances of LEDs 310 can still be decided based on that temperature distribution.

In this embodiment, LEDs 310 are white LEDs, but the same kind of effect as described above can also be realized if LEDs 310 are a combination of LEDs of three colors—R (red), G (green), and B (blue). In this case, a configuration is employed in which more red LEDs, which decrease greatly in brightness due to temperature, are placed in a high-temperature area than green or blue LEDs. By this means, the color temperature balance can also be maintained over a long period.

If illumination of LED backlight 600 is interlinked with a liquid crystal panel 751 screen display scan and a backlight scan is performed to improve liquid crystal moving image performance, it is necessary to take account of the fact that the pitch differs in the LED vertical direction, and perform control of the LED backlight 600 illumination start time interlinked with the scan.

Embodiment 9

Figures 19A, 19B:
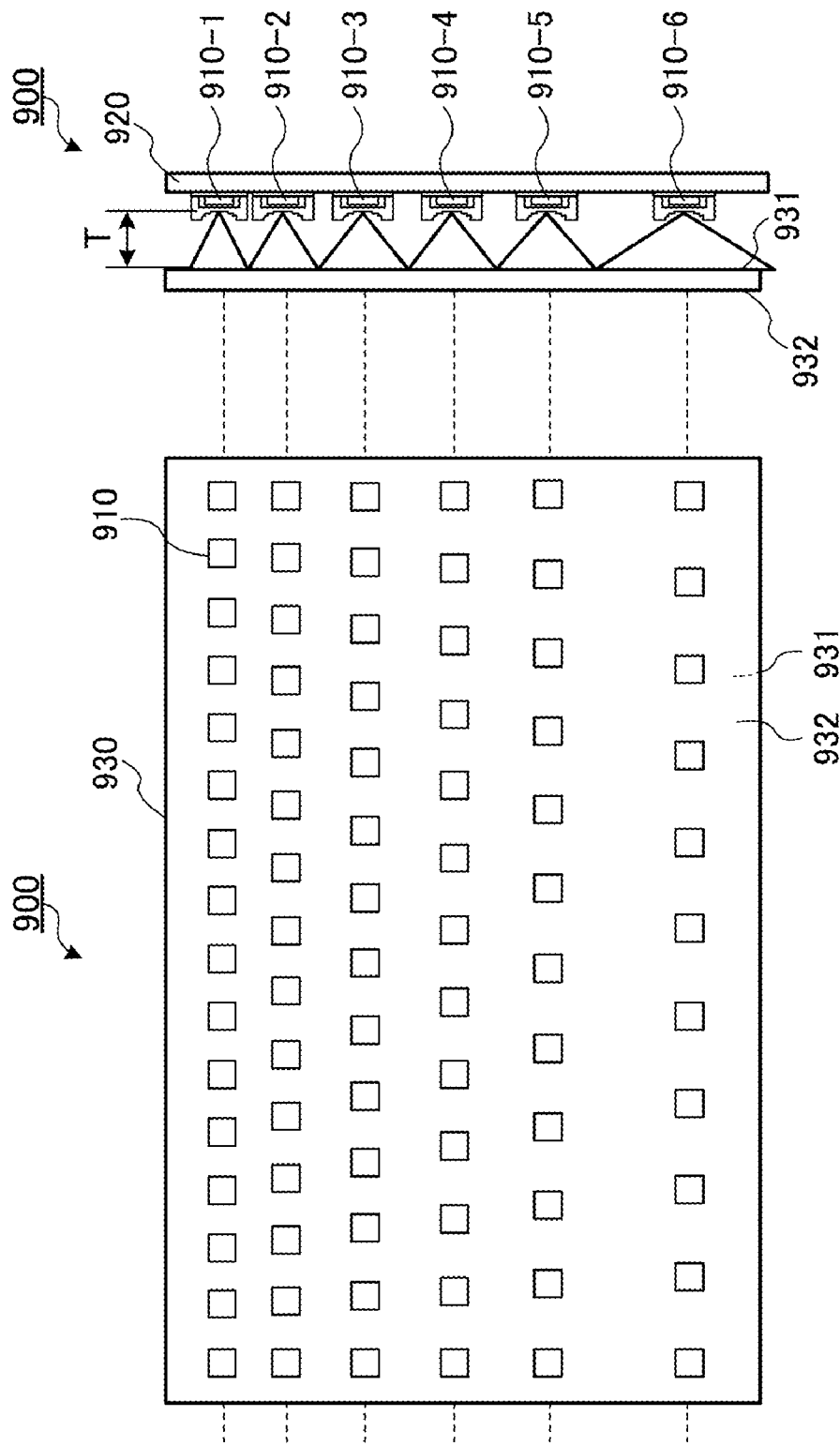
FIG. 19A is a schematic front view of an LED backlight according to Embodiment 9 of the present invention.
FIG. 19B is a schematic side view of an LED backlight according to Embodiment 9 of the present invention.

FIG. 19A and FIG. 19B are drawings showing the configuration of an LED backlight (backlight apparatus) according to Embodiment 9 of the present invention. FIG. 19A is a schematic front view of the LED backlight, and FIG. 19B is a schematic side view of the LED backlight. This embodiment relates, for example, to an LED backlight that is used as a backlight in a liquid crystal display and is configured so that brightness at the top of the screen is made particularly high when the liquid crystal display is set up so that screen is vertical. A vertical direction in FIG. 19A and FIG. 19B corresponds to a vertical direction when the liquid crystal display apparatus in which the LED backlight is used is set up—that is, the vertical direction of the screen.

In FIG. 19A and FIG. 19B, LED backlight 900 has a plurality of types of LEDs 910-1 through 910-6, substrate 920 on which LEDs 910-1 through 910-6 are placed, and diffuser plate 930 placed on the light emitting side of LEDs 910-1 through 910-6, as main components. LEDs 910-1 through 910-6 are white LEDs, for example. Substrate 920 is a flat printed circuit board using a material having insulating properties, such as glass epoxy resin. Diffuser plate 930 is a flat acrylic sheet, having inputting surface 931 upon which light emitted from plurality of LEDs 910 is input, and outputting surface 932 placed opposite inputting surface 931. Diffuser plate 930 diffuses light input upon inputting surface 931 by means of surface diffusion, internal diffusion, or a combination thereof, and outputs light from outputting surface 932.

Substrate 920 is placed parallel to diffuser plate 930. LEDs 910-1 through 910-6 have lenses for controlling the light distribution characteristics of emitted light. LEDs 910-1 through 910-6 are placed in that order starting from the top of the drawing, and are placed with progressively greater density in the upward direction. Also, LEDs 910-1 through 910-6 are placed in such a way that light distribution gradually becomes wider in that order. That is to say, the lower the placement density of LEDs 910, the wider is their light distribution. Here, "having a wide light distribution" means that the spread distribution of emitted light is wide. Light distribution characteristics are set arbitrarily by adjustment of the shape or refractive power of the LED 910 lenses, for example.

An example of numeric values when the placement density of LEDs 910-1 located at the top is designated Dh, the placement density of LEDs 910-6 located at the bottom is designated Dl, and the distance from LEDs 910 to inputting surface 931 of diffuser plate 930 (the light source distance) is designated T, is shown below.

$Dh$=0.0064 [units/mm^2] (average pitch with square placement: 12.5 mm)

$Dl$=0.0016 [units/mm^2] (average pitch with square placement: 20 mm)

$T$=10 [mm]

With the above example of numeric values, the average pitch of LEDs 910-6 located at the bottom is 1.6 times wider than the average pitch of LEDs 910-1 located at the top.

Figure 20:
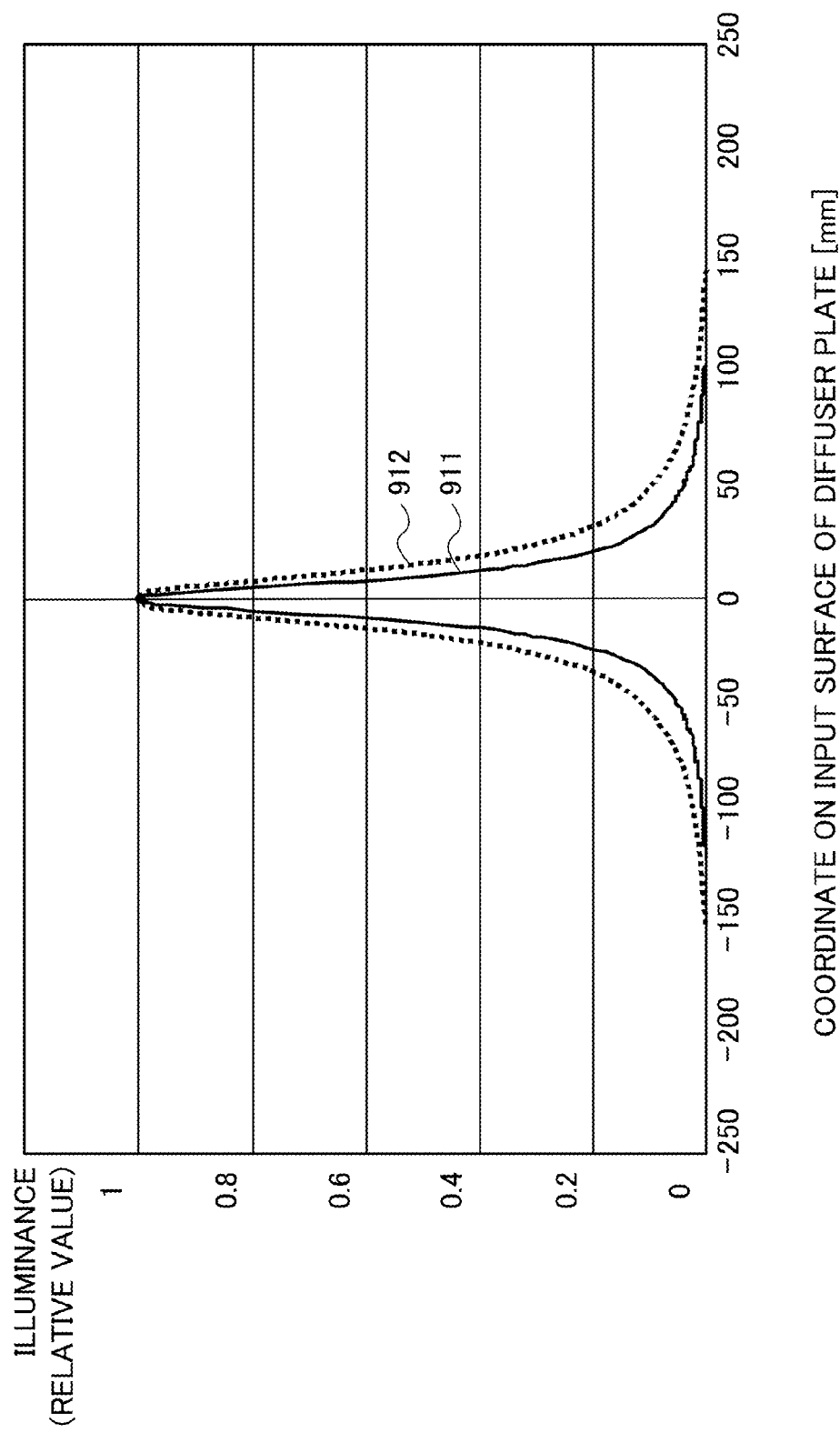
FIG. 20 is a drawing comparing the illuminance of emitted light of LEDs having different light distribution characteristics according to Embodiment 9 of the present invention.

FIG. 20 is a drawing comparing the illuminance of emitted light of LEDs 910-1 with the illuminance of emitted light of LEDs 910-6. In FIG. 20, the horizontal axis indicates a coordinate [mm] on inputting surface 931 of diffuser plate 930, and the vertical axis indicates a relative value corresponding to illuminance in the optical axis of the respective LEDs 910.

As shown in FIG. 20, when spread distribution 911 of emitted light of LEDs 910-1 is compared with spread distribution 912 of emitted light of LEDs 910-6, spread distribution 912 of emitted light of LEDs 910-6 is 1.6 times wider than spread distribution 911 of emitted light of LEDs 910-1.

Thus, in this embodiment, the ratio between the average pitches of LEDs 910-1 and LEDs 910-6, and the ratio between the average spread distributions of LEDs 910-1 and LEDs 910-6, are both 1.6, and have nearly matching configurations. That is to say, the spread distribution of light is in accordance with the placement density of LEDs 910. Therefore, nonuniformity of brightness in inputting surface 931 of diffuser plate 930 can be reduced.

Also, since there is no particular influence on the external shape of the LED backlight 900 apparatus, a liquid crystal display apparatus using LED backlight 900 is advantageous in terms of design characteristics and production costs.

In this embodiment, a configuration has been described in which the ratio between the average pitches of LEDs 910-1 and LEDs 910-6, and the ratio between the average spread distributions of LEDs 910-1 and LEDs 910-6, are both 1.6, but this embodiment is not limited to this. Essentially, it is sufficient for a configuration to provide approximate coincidence between the average pitch ratio of LEDs 910 and the average spread distribution ratio of LEDs 910.

In this embodiment, the high/low placement density variation trend of LEDs 910 is not limited to what has been described above. For example, in a case in which placement density becomes progressively higher in the downward direction of diffuser plate 930, nonuniformity of brightness can be similarly reduced by selecting types of LEDs 910 so that light distribution becomes wider the lower the placement density of a position.

Embodiment 10

As Embodiment 10 of the present invention, an LED backlight will be described that provides for control of the amount of luminescence of LEDs.

Figure 21:
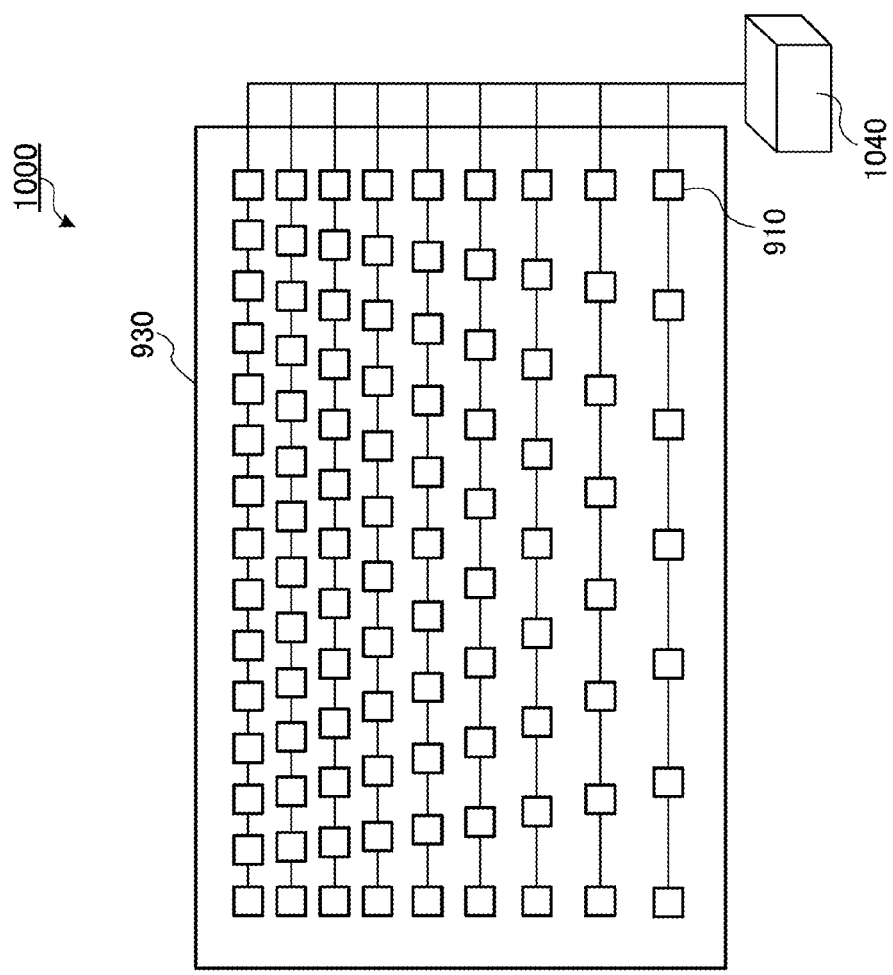
FIG. 21 is a drawing showing the configuration of an LED backlight according to Embodiment 10 of the present invention.

FIG. 21 is a schematic configuration diagram drawing showing the configuration of an LED backlight according to Embodiment 10 of the present invention.

In FIG. 21, LED backlight 1000 has a plurality of LEDs 910 placed with uniform placement density in the horizontal direction and with nonuniform placement density in the vertical direction. That is to say, the LED 910 placement density distribution is of the same kind as in Embodiment 9. Also, LED backlight 1000 has LED drive section 1040 that controls the amount of luminescence of plurality of LEDs 910.

Taking a plurality of LEDs 910 aligned in the horizontal direction as one block, LED drive section 1040 controls the amount of luminescence of each LED 910 on a block-by-block basis according to an input control signal.

By means of this kind of configuration, control of the amount of luminescence of LEDs 910 can be performed in a manner appropriate to the LED 910 placement density distribution, and a desired brightness distribution can be obtained efficiently.

Embodiment 11

As Embodiment 11 of the present invention, a liquid crystal display apparatus will be described that uses an LED backlight according to Embodiment 10.

Figure 22:
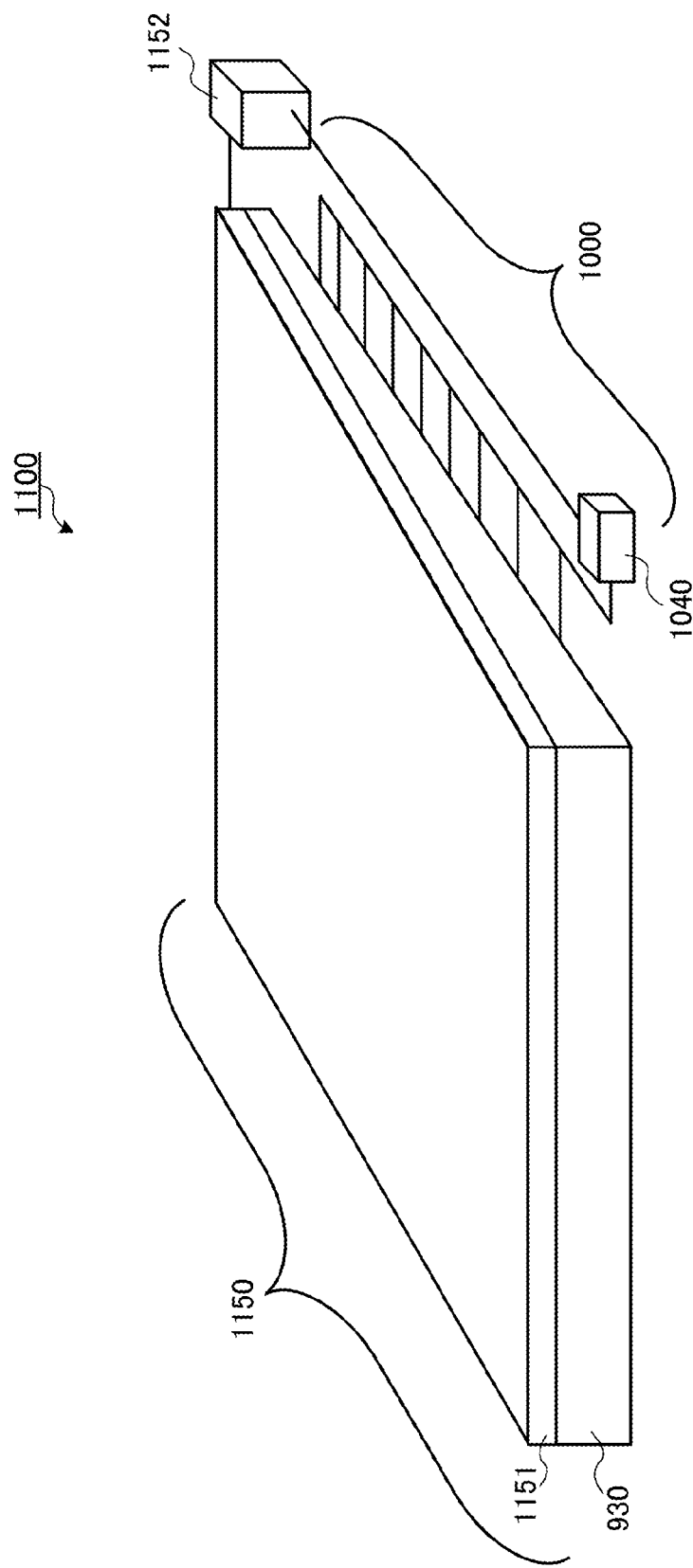
FIG. 22 is a drawing showing the configuration of a liquid crystal display apparatus according to Embodiment 11 of the present invention.

FIG. 22 is a schematic configuration diagram showing the configuration of a liquid crystal display apparatus according to Embodiment 11 of the present invention.

In FIG. 22, liquid crystal display apparatus 1100 has LED backlight 1000 according to Embodiment 10 and liquid crystal unit 1150. Components identical to those in FIG. 21 are assigned the same reference codes as in FIG. 21, and descriptions thereof are omitted here.

Liquid crystal unit 1150 is illuminated by LED backlight 1000, and controls the arrival on the observer's side of light emitted from LED backlight 1000. Liquid crystal unit 1150 has liquid crystal panel 1151 and liquid crystal driver 1152.

Liquid crystal panel 1151 is a transmissive or semi-transmissive liquid crystal panel. Liquid crystal panel 1151 transmits light emitted from LED backlight 1000, and emits this transmitted light from the front surface of the display screen.

Liquid crystal driver 1152 controls a drive voltage that drives liquid crystal panel 1151 based on a video signal that is a digital signal indicating video to be displayed on the display screen of liquid crystal panel 1151, and thereby controls the transmittance of liquid crystal panel 1151. As a result of this control, liquid crystal panel 1151 displays video.

LED backlight 1000 controls the amount of luminescence of LEDs 910 on a block-by-block basis as described in Embodiment 10. On the other hand, light transmittance cannot be made zero for liquid crystal panel 1151. Therefore, by minimizing the amount of luminescence of LEDs 910 on a block-by-block basis, black brightness—the brightness of a black display part of the screen—can be reduced, and an improvement in screen contrast can be achieved.

Thus, according to this embodiment, video having a desired brightness distribution without nonuniformity of brightness can be displayed with a high degree of contrast, and power consumption can be reduced.

In the above-described embodiments, cases have been described in which a light source is an LED, but the present invention is not limited to this. For example, the present invention can also be applied to cases in which light sources are of various kinds, such as a semiconductor laser, gas laser, solid-state laser, fiber laser, lamp, and so forth, and various kinds of line light sources of a cathode ray tube or the like are placed with nonuniform distribution.

Embodiment 12

As Embodiment 12 of the present invention, a liquid crystal display apparatus that is distinctive in regard to liquid crystal driver placement and operation of the LED drive section will be described.

Figure 23:
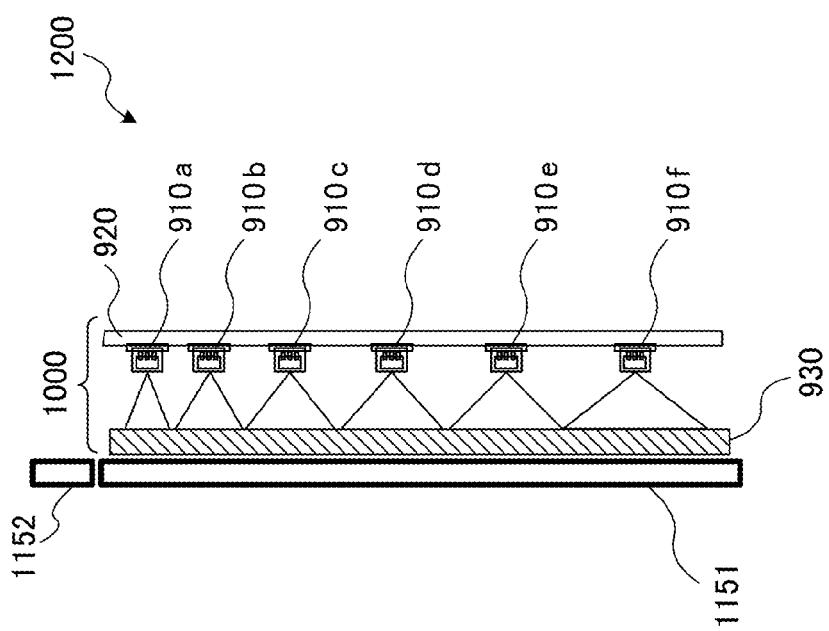
FIG. 23 is a side view of the principal parts of a liquid crystal display apparatus according to Embodiment 12 of the present invention.

FIG. 23 is a side view of the principal parts of a liquid crystal display apparatus according to Embodiment 12 of the present invention, and corresponds to FIG. 19B of Embodiment 9 and FIG. 22 of Embodiment 11. Components identical to those in FIG. 19B and FIG. 22 are assigned the same reference codes as in FIG. 19B and FIG. 22, and descriptions thereof are omitted here.

Liquid crystal display apparatus 1200 has liquid crystal panel 1151, liquid crystal driver 1152, and LED backlight 1000 as main components.

In this embodiment, liquid crystal driver 1152 is placed in proximity to the upper edge of liquid crystal panel 1151.

Liquid crystal driver 1152 may also be placed in a location other than the above. For example, liquid crystal driver 1152 may be placed in proximity to the lower edge, left-hand edge, or right-hand edge of liquid crystal panel 1151, or may be placed elsewhere.

In LED backlight 1000, substrate 920 is placed opposite diffuser plate 930 placed on the rear surface side of liquid crystal panel 1151, in the same way as in Embodiment 9. The surface of substrate 920 is an opposed section opposite the rear surface of liquid crystal panel 1151, and LEDs 910a, 910b, 910c, 910d, 910e, and 910f are arrayed on this surface in approximately flat form facing the rear surface of diffuser plate 930. Diffuser plate 930 has a diffusing action on the input light, and outputs light from the outputting surface toward the rear surface of liquid crystal panel 1151. That is to say, LED backlight 1000 is a subjacent type of LED backlight.

Generally, a subjacent type of LED backlight has a sealed structure that can prevent the infiltration of dust or dirt, but LED backlight 1000 may or may not employ a sealed structure.

LED backlight 1000 illuminates liquid crystal panel 1151 with light emitted from LEDs 910a, 910b, 910c, 910d, 910e, and 910f. In the following description, LEDs 910a, 910b, 910c, 910d, 910e, and 910f are referred to simply as "LED(s) 910" when described without any particular differentiation.

LED backlight 1000 also has an LED drive section that drives LEDs 910, described later herein.

Here, LEDs 910 are white LEDs that emit white light when driven by a drive signal applied from an LED drive section described later herein. For example, when LEDs 910 are LED apparatuses having mainly a monochromatic (for example, blue) LED and a fluorescent material, LEDs 910 are configured so that light emitted from a monochromatic LED when a drive signal is applied is transmitted through the fluorescent material and becomes white light through the action of the fluorescent material.

LEDs 910 may also employ another configuration, such as a combination of LEDs of three colors—R (red), G (green), and B (blue).

Figure 24:
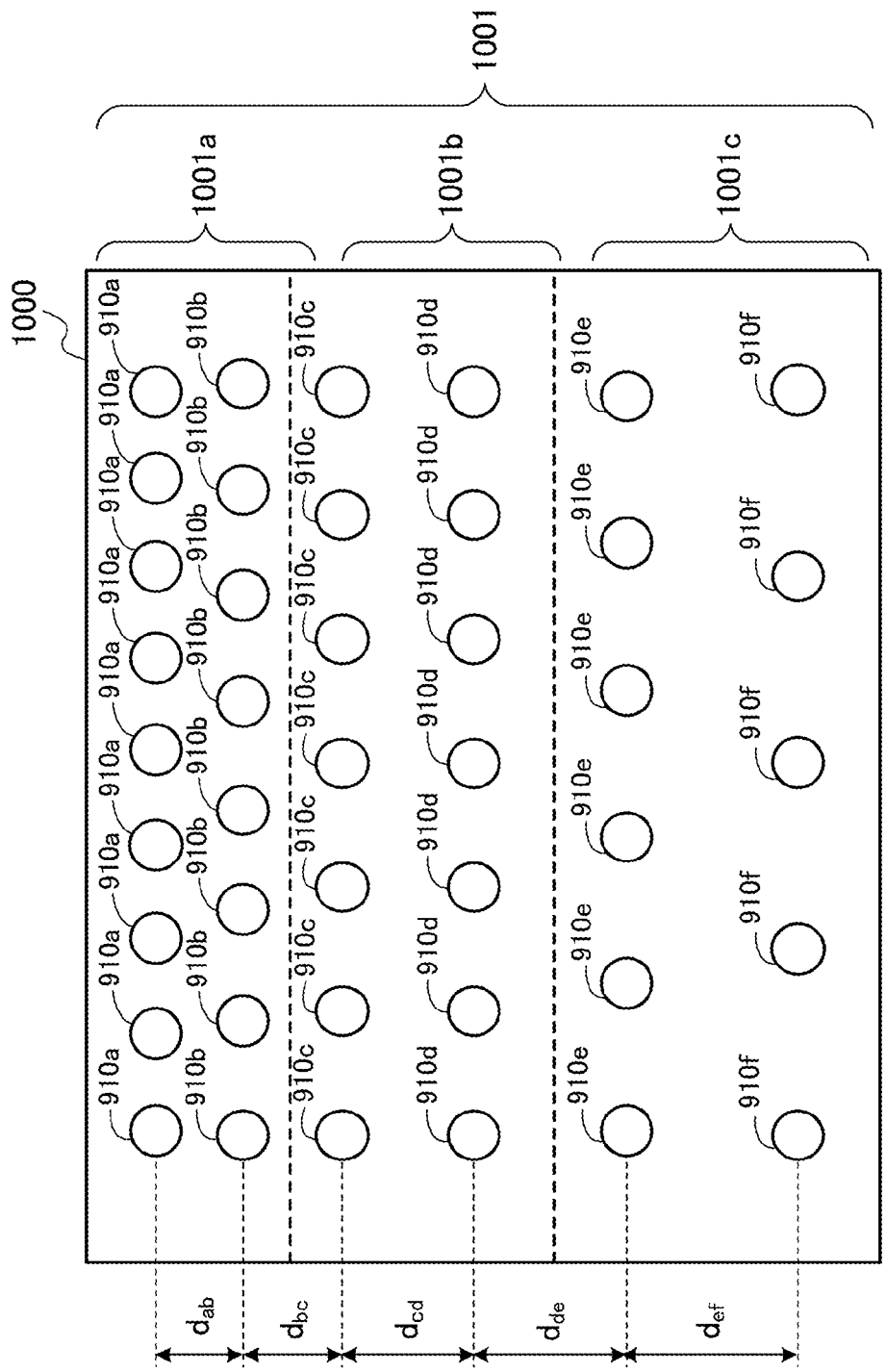
FIG. 24 is a drawing showing an LED array of an LED backlight according to Embodiment 12 of the present invention.

FIG. 24 is a drawing showing the placement of LEDs 910 in LED backlight 1000.

LEDs 910 placed in area 1001a located at the top are placed most densely, LEDs 910 placed in area 1001c located at the bottom are placed least densely, and LEDs 910 placed in area 1001b located in the middle are placed with medium density. To be more specific, in the vertical direction, pitch $d_{ab}$ between LED 910a and LED 910b is smaller than pitch $d_{bc}$ between LED 910b and LED 910c, pitch $d_{bc}$ is smaller than pitch $d_{cd}$ between LED 910c and LED 910d, pitch $d_{cd}$ is smaller than pitch $d_{de}$ between LED 910d and LED 910e, and pitch $d_{de}$ is smaller than pitch $d_{ef}$ between LED 910d and LED 910f. Also, in the horizontal direction, the pitch of LEDs 910a is smaller than the pitch of LEDs 910b, the pitch of LEDs 910b is smaller than the pitch of LEDs 910c, the pitch of LEDs 910c is smaller than the pitch of LEDs 910d, the pitch of LEDs 910d is smaller than the pitch of LEDs 910e, and the pitch of LEDs 910e is smaller than the pitch of LEDs 910f.

LEDs 910 have a configuration such that emitted light is diffused progressively more widely in the downward direction in the drawing.

Figure 25B:
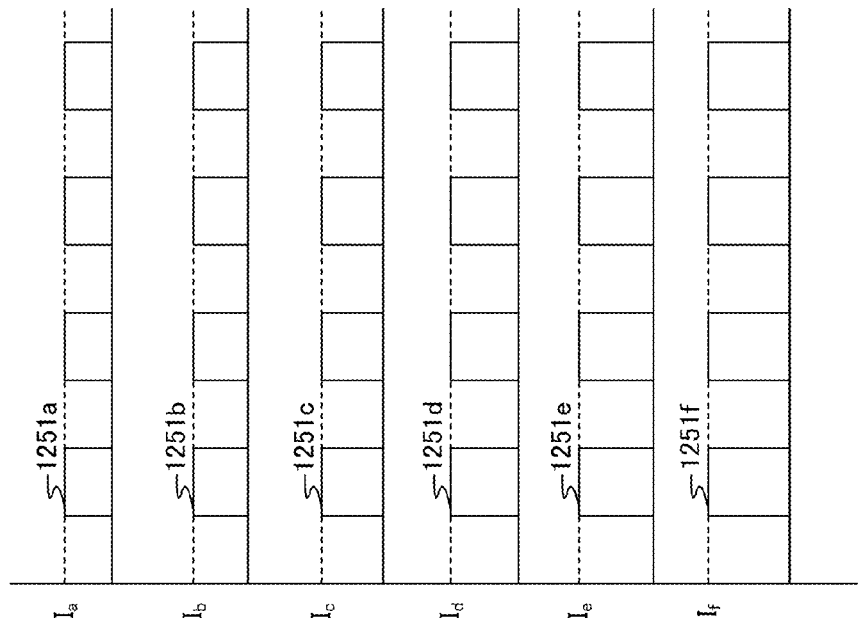
FIG. 25B is a waveform diagram showing drive signals according to Embodiment 12 of the present invention.
Figure 25A:
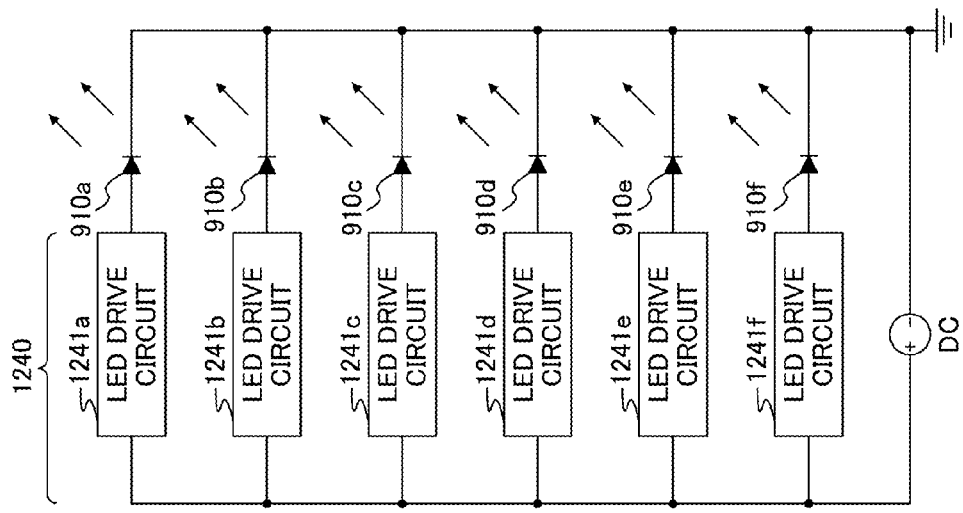
FIG. 25A is a circuit diagram showing the configuration of an LED drive section according to Embodiment 12 of the present invention.

FIG. 25A and FIG. 25B are drawings for explaining an LED drive section in LED backlight 1000. FIG. 25A is a circuit diagram showing an example of the configuration of the LED drive section, and FIG. 25B is a waveform diagram showing an example of drive signals generated by the LED drive section and supplied to LEDs 910.

LED drive section 1240 has LED drive circuits 1241a, 1241b, 1241c, 1241d, 1241e, and 1241f. In the following description, LED drive circuits 1241a, 1241b, 1241c, 1241d, 1241e, and 1241f are referred to simply as "LED drive circuit(s) 1241" when described without any particular differentiation.

LED drive circuit 1241a supplies drive signal 1251a having preset current value $I_a$ to one LED 910a as a current supplying section. LED drive circuit 1241b supplies drive signal 1251b having current value $I_b$ to one LED 910b as a current supplying section. LED drive circuit 1241c supplies drive signal 1251c having current value $I_c$ to one LED 910c as a current supplying section. LED drive circuit 1241d supplies drive signal 1251d having current value $I_d$ to one LED 910d as a current supplying section. LED drive circuit 1241e supplies drive signal 1251e having current value $I_e$ to one LED 910e as a current supplying section. LED drive circuit 1241f supplies drive signal 1251f having current value $I_f$ to one LED 910f as a current supplying section.

Although not shown in FIG. 25A, LED drive section 1240 has the same number of LED drive circuits 1241 (as current supplying sections) as LEDs 910. Each LED drive circuit 1241 supplies a drive signal to one LED 910. By means of this configuration, each LED 910a is supplied with drive signal 1251a having current value $I_a$, each LED 910b is supplied with drive signal 1251b having current value $I_b$, each LED 910c is supplied with drive signal 1251c having current value $I_c$, each LED 910d is supplied with drive signal 1251d having current value $I_d$, each LED 910e is supplied with drive signal 1251e having current value $I_e$, and each LED 910f is supplied with drive signal 1251f having current value $I_f$.

Here, current value $I_a$ is smaller than current value $I_b$, current value $I_b$ is smaller than current value $I_c$, current value $I_c$ is smaller than current value $I_d$, current value $I_d$ is smaller than current value $I_e$, and current value $I_e$ is smaller than current value $I_f$. Drive signals 1251a, 1251b, 1251c, 1251d, 1251e, and 1251f all have the same duty cycle.

That is to say, among LEDs 910, those placed higher up and located nearer liquid crystal driver 1152 are supplied with a lower current.

The current value of each LED 910 is set optimally based on the temperature distribution in surface area 1001 of LED backlight 1000. For example, in an area (for example, area 1001a) shown as a high-temperature area in the temperature distribution for a reason such as being located comparatively high up, or being located comparatively near liquid crystal driver 1152, an LED 910 current value is set comparatively low. And in an area (1001c) shown as a low-temperature area in the temperature distribution for a reason such as being located comparatively low down, or being located comparatively far from liquid crystal driver 1152, an LED 910 current value is set comparatively high. These settings are made in such a way that the junction temperature becomes equal in all LEDs 910.

By this means, among LEDs 910, those placed higher up and located nearer liquid crystal driver 1152 emit light at lower brightness. When this kind of drive control is performed, a difference in brightness may occur between individual LEDs 910. However, since the junction temperatures of all LEDs 910 are equal, no difference in aging degradation progress occurs between individual LEDs 910. Therefore, even if there is a difference in brightness between LEDs 910, such a balance of brightness is maintained unchanged over a long period.

Also, among LEDs 910, those placed higher up, located nearer liquid crystal driver 1152, and supplied with a lower current, are placed with higher density adjacent to another LED 910.

Also, with LED backlight 1000, the lower the placement density of a position, the wider is the diffusion of light that is emitted from LEDs 910. By this means, an irradiated area in the inputting surface of diffuser plate 930 increases, enabling nonuniformity of brightness in the outputting surface of diffuser plate 930 to be reduced.

By this means, uniformity of brightness is realized over the entire area of the display screen, and is maintained unchanged over a long period.

It is possible to obtain the same kind of effect by making current values I the same, making the duty cycle of drive signal 1251a smaller than that of drive signal 1251b, making the duty cycle of drive signal 1251b smaller than that of drive signal 1251c, making the duty cycle of drive signal 1251c smaller than that of drive signal 1251d, making the duty cycle of drive signal 1251d smaller than that of drive signal 1251e, and making the duty cycle of drive signal 1251e smaller than that of drive signal 1251f.

Next, the brightness correction method used in liquid crystal display apparatus 1200 will be described.

Figure 26:
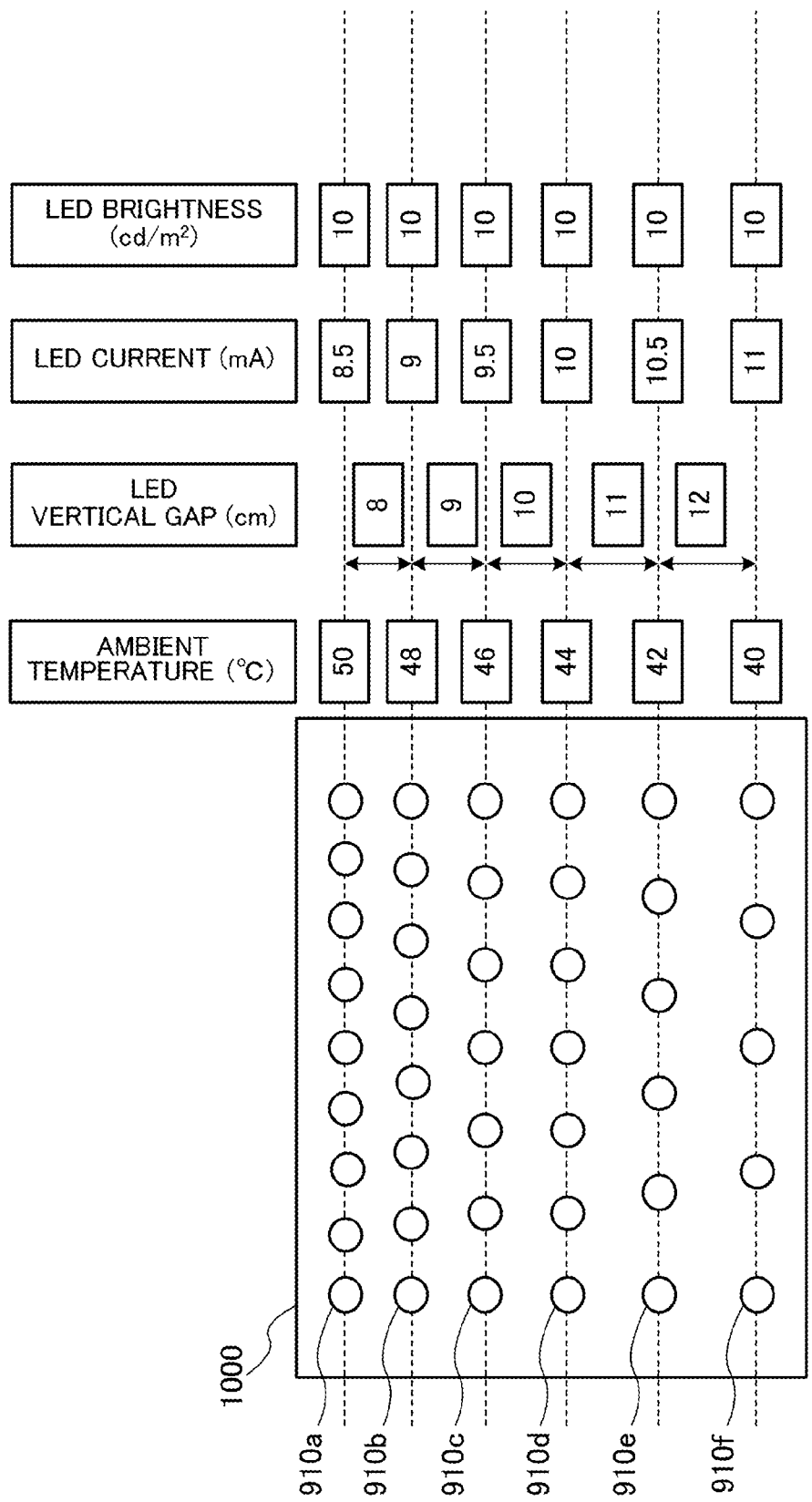
FIG. 26 is a drawing showing a brightness correction method according to Embodiment 12 of the present invention.

FIG. 26 is a drawing for explaining the brightness correction method used in liquid crystal display apparatus 1200. Here, a case is described by way of example in which the ambient temperature of an area located higher up becomes higher during LED 910 illumination.

LEDs 910 are placed with higher density the higher their placement position. Simply by employing this kind of LED placement, a difference in a decrease in LED 910 brightness due to a difference in ambient temperature can be corrected, and brightness can be made uniform over the entire area of the display screen. This is possible even if drive signals with the same current value are supplied to all LEDs 910.

However, in this embodiment, LED placement is decided in such a way that supposing that drive signals with the same current value are supplied to all LEDs 910, brightness is higher in an area higher up in the display screen. Thus, when this kind of LED placement is employed, LEDs 910 are supplied with a lower current the higher their placement position. By this means, brightness in the LED 910a illumination area (that is, the area of the display screen illuminated by light emitted from all LEDs 910a), brightness in the LED 910b illumination area, brightness in the LED 910c illumination area, brightness in the LED 910d illumination area, brightness in the LED 910e illumination area, and brightness in the LED 910f illumination area, become uniform.

According to the brightness correction method shown in FIG. 26, the same kind of effect can be realized as described with reference to FIG. 5A and FIG. 5B in Embodiment 1.

Therefore, according to this embodiment, a lower current is supplied to LEDs 910 placed in an area with a higher ambient temperature within surface area 1001 of substrate 920 of LED backlight 1000. By this means, the progress of aging degradation of all LEDs 910 provided in LED backlight 1000 is made uniform. Therefore, the balance of brightness over the entire area of the display screen can be maintained over a long period. Also, according to this embodiment, control to slow aging degradation (that is, supply of a relatively low current) is performed for those of LEDs 910 for which aging degradation should be relatively rapid due to a relatively high ambient temperature. Therefore, the life of LED backlight 1000 can be prolonged.

Also, according to this embodiment, the lower the placement density of a position, the wider is the diffusion of light that is emitted from LEDs 910. By this means, nonuniformity of brightness in the outputting surface of diffuser plate 930 can be reduced even if a configuration is employed that achieves longer life by varying the placement density, as described above.

In this embodiment, a case has been described by way of example in which the ambient temperature of an area higher up is higher, and a configuration has been described in which LEDs 910 placed in an area higher up are placed with higher density, and are driven by a lower current. However, other configurations are also possible.

For example, if liquid crystal driver 1152 is placed in proximity to the lower edge of liquid crystal panel 1151, so that the ambient temperature of a lower area becomes higher than that of an area above, a configuration can be employed in which LEDs 910 placed in a lower area are placed with higher density, and are driven by a lower current. With this configuration, provision should be made for light emitted from LEDs 910 to be diffused more widely the higher up an area is.

Also, if liquid crystal driver 1152 is placed in proximity to the left-hand edge of liquid crystal panel 1151, so that the ambient temperature of an area to the left becomes higher than that of an area to the right, a configuration can be employed in which LEDs 910 placed in an area to the left are placed with higher density, and are driven by a lower current. With this configuration, provision should be made for light emitted from LEDs 910 to be diffused more widely the farther to the right an area is.

Also, if liquid crystal driver 1152 is placed in proximity to the right-hand edge of liquid crystal panel 1151, so that the ambient temperature of an area to the right becomes higher than that of an area to the left, a configuration can be employed in which LEDs 910 placed in an area to the right are placed with higher density, and are driven by a lower current. With this configuration, provision should be made for light emitted from LEDs 910 to be diffused more widely the farther to the left an area is.

Essentially, when the ambient temperature of an area near liquid crystal driver 1152 becomes higher than the ambient temperature of an area farther away, a configuration can be employed in which LEDs 910 placed in the former area are placed with higher density, and are driven by a lower current.

Exactly the same applies to a power supply section—that is, power supply circuitry supplying power to liquid crystal driver 1152, LED drive circuits 1241, and so forth—and to other heat-generating members, as to liquid crystal driver 1152. This is because a power supply section and the like also generate heat. Thus, the placement, drive current values, and light source distances of LEDs 910 can be decided according to the placement positions of a power supply section and so forth.

Even if there is temperature distribution such that the ambient temperature of an area higher up does not become higher due to the internal structure of liquid crystal display apparatus 1200, the placement, drive current values, and light source distances of LEDs 910 can still be decided based on that temperature distribution.

In this embodiment, LEDs 910 are white LEDs, but the same kind of effect as described above can also be realized if LEDs 910 are a combination of LEDs of three colors—R (red), G (green), and B (blue). In this case, a configuration is employed in which more red LEDs, which decrease greatly in brightness due to temperature, are placed in a high-temperature area than green or blue LEDs. By this means, the color temperature balance can also be maintained over a long period.

If illumination of LED backlight 1000 is interlinked with a liquid crystal panel 1151 screen display scan and a backlight scan is performed to improve liquid crystal moving image performance, it is necessary to take account of the fact that the pitch differs in the LED vertical direction, and perform control of the LED backlight 1000 illumination start time interlinked with the scan.

This concludes a description of embodiments of the present invention.

The above descriptions are illustrations of preferred embodiments of the present invention, and the scope of the present invention is not limited to these. That is to say, the configurations and operations during use of the above-described apparatuses are simply examples, and it is clearly possible to make various modifications and additions to these examples without departing from the scope of the present invention.

What is claimed is:

1. A backlight apparatus that is used in a liquid crystal display apparatus having a liquid crystal panel as a display screen, the backlight apparatus comprising:
    a substrate having an opposed section placed opposite a rear surface side of the liquid crystal panel;
    a plurality of light emitting diodes placed with nonuniform placement density on the opposed section;
    a diffuser plate upon which light emitted from the plurality of light emitting diodes is input and that has a diffusing action on the input light and outputs diffused light toward the liquid crystal panel side; and
    a current supplying section that supplies to the plurality of light emitting diodes a current that causes the plurality of light emitting diodes to emit light that illuminates the liquid crystal panel, wherein:
    the current supplying section supplies a lower current to a light emitting diode placed in an area having a higher ambient temperature within an area of the opposed section in proximity to a liquid crystal driver controlling a drive voltage of the liquid crystal panel;
    a light emitting diode to which a lower current is supplied is placed with highest placement density adjacent to another light emitting diode; and
    a light emitting diode placed at a position having the lowest placement density emits more widely-distributed light than that of a light emitting diode placed at a position having the highest placement density.

2. The backlight apparatus according to claim 1, wherein the plurality of light emitting diodes are placed with nonuniform placement density in at least one of a horizontal direction and a vertical direction of the display screen.

\* \* \* \* \*